US010230598B1

(12) United States Patent
Pigoski, II et al.

(10) Patent No.: US 10,230,598 B1
(45) Date of Patent: Mar. 12, 2019

(54) METHOD AND SYSTEM FOR PROVIDING VISUALIZATION OF INSTANCE DATA TO IDENTIFY AND EVALUATE RE-STACKING POLICIES IN A CLOUD COMPUTING ENVIRONMENT

(71) Applicant: Intuit Inc., Mountain View, CA (US)

(72) Inventors: Thomas M. Pigoski, II, San Francisco, CA (US); Theresa M. Dayog, Sunnyvale, CA (US); Edward L. Farmer, San Jose, CA (US); Rajan Bansal, Fremont, CA (US); Mark Richard Friberg, Sparks, NV (US)

(73) Assignee: Intuit Inc., Mountain View, CA (US)

( * ) Notice: Subject to any disclaimer, the term of this patent is extended or adjusted under 35 U.S.C. 154(b) by 195 days.

(21) Appl. No.: 15/414,123

(22) Filed: Jan. 24, 2017

(51) Int. Cl.
G06F 9/455 (2018.01)
H04L 12/24 (2006.01)
H04L 12/26 (2006.01)
H04L 29/08 (2006.01)

(52) U.S. Cl.
CPC ........ *H04L 43/045* (2013.01); *G06F 9/45558* (2013.01); *H04L 41/12* (2013.01); *H04L 41/20* (2013.01); *H04L 41/22* (2013.01); *H04L 67/10* (2013.01); *G06F 2009/45595* (2013.01); *H04L 67/02* (2013.01)

(58) Field of Classification Search
CPC ....... H04L 43/045; H04L 41/12; H04L 41/20; H04L 41/22; H04L 67/02; H04L 67/10; G06F 9/45558
See application file for complete search history.

(56) References Cited

U.S. PATENT DOCUMENTS

| 7,933,794 | B2* | 4/2011 | Adi | G06Q 10/06 705/300 |
| 9,128,739 | B1* | 9/2015 | Juels | G06F 9/45533 |
| 2014/0149591 | A1* | 5/2014 | Bhattacharya | H04L 67/1097 709/226 |
| 2018/0048522 | A1* | 2/2018 | Pan | H04L 29/08 |
| 2018/0150356 | A1* | 5/2018 | Boshev | G06F 11/142 |
| 2018/0159747 | A1* | 6/2018 | Chang | H04L 67/10 |

* cited by examiner

*Primary Examiner* — Larry D Donaghue
(74) *Attorney, Agent, or Firm* — Hawley Troxell Ennis & Hawley LLP; Philip McKay

(57) ABSTRACT

A re-stacking data visualization display is generated that includes individual graphic representations of instances (virtual computing systems) used to provide a software application in a cloud computing environment. The re-stacking data visualization display shows a launch date for each instance, a termination date for the instance, an indication of the instance creation template used to generate that instance, and the base instance creation template release dates for each of the base instance creation templates. Consequently, the re-stacking policy associated with a software application offering can be readily determined by a simple examination of the re-stacking data visualization display. As a result, any potential security issues and vulnerabilities can be readily identified and addressed.

54 Claims, 10 Drawing Sheets

METHOD AND SYSTEM FOR PROVIDING VISUALIZATION OF INSTANCE DATA TO IDENTIFY AND EVALUATE RE-STACKING POLICIES IN A CLOUD COMPUTING ENVIRONMENT

BACKGROUND

As more and more applications, services, and data have moved to cloud computing models, security of data and accounts has become a paramount issue and a significant challenge requiring new and unique solutions and patterns.

As a specific example, in traditional computing environments, e.g., non-cloud computing environments, when a security vulnerability, or other software application feature, needed to be addressed or upgraded, additional code, known as a "patch," was provided to the physical hardware-based computing system, i.e. server, providing the software application and this patch code was then incorporated in the software running on the hardware computing system. This type of "fix" was acceptable, and efficient, in a hardware-based server environment where the replacement of the hardware computing system server itself was not an economically viable option.

However, in a cloud computing environment, the "computing systems/servers" are actually virtual machines, known as instances, which are not themselves hardware systems but are instead software-based entities which operate like traditional physical hardware-based computing systems/servers.

One of the many advantages associated with virtual machine instances of computing system/servers is that these instances can be generated and terminated at will without the need for replacing physical hardware. Consequently, when a new software vulnerability solution, or other fix is required, instead of implementing a patch on a physical hardware system, as was done traditionally to repair a vulnerability, the entire virtual computing system/server instance can be terminated and new computing system/server instances can be generated or "spun up" to replace the terminated instances, with the new instances being based on, or running, the updated software.

In particular, a given computing system/server virtual machine instance, hereafter referred to as simply an "instance," is typically created in a cloud computing environment using an instance creation template. As used herein, the term "instance creation template" is used to denote a special type of virtual appliance that is used to create a virtual machine (instance) within a cloud computing environment. A specific illustrative example of an instance creation template is an Amazon Machine Image (AMI). An AMI is a special type of instance creation template that is a virtual appliance used to create a virtual machine within the Amazon Elastic Compute Cloud ("EC2"). An AMI serves as the basic unit of deployment for services delivered using EC2.

In a cloud computing environment, one way to correct a vulnerability, or otherwise update or correct, a system/application is to issue a new instance creation template which incorporates the desired change/fix. In an AWS environment, this means issuing new or updated AMIs. Consequently, in a cloud computing environment, whenever a new instance creation template, referred to herein as a new base instance creation template, is generated and made available, it is highly desirable that all instances associated with an account or application that were created using previously generated base instance creation templates be terminated and new instances, based on the new instance creation template, be created/launched to replace the old instances based on the old instance creation template. Then the instances based on the new instance creation template can be used to service the account and implement and/or offer the application associated with the account.

The process of terminating old instances associated with a given account or application and replacing those instances with new instances is referred to herein as "re-stacking."

As can be seen from the discussion above, the re-stacking of instances associated with a given account or application, and the resulting restacking patterns, is a significant indicator of the overall security and efficiency of the account and associated application. Indeed, were an account holder, application provider, or cloud computing system environment provider given the capability to easily identify and evaluate restacking policies associated with a given account and application, then significant information regarding the security of the account, application, and even the entire cloud computing environment, could be readily recognized.

However, despite the value of an efficient and effective process to identify and evaluate restacking policies associated with a given account, there is currently no mechanism or system available to effectively and efficiently identify and evaluate restacking policies or patterns associated with a given account or application. This is largely due to the fact that many account holders, application providers, and cloud computing system providers have yet to fully recognize the significance of re-stacking policy analysis and that the amounts of data that must be analyzed for even a modest account or application offering is potentially overwhelming. Consequently, there is currently no algorithm or process for obtaining this re-stacking policy and pattern data and processing it in a manner that produces a useful visualization/analysis tool.

Therefore, there is a long standing technical need in the cloud computing arts for providing an easy to understand process to identify and evaluate re-stacking policies.

SUMMARY

In accordance with one embodiment, a re-stacking data visualization display is generated that includes individual graphic representations of instances (virtual computing systems/servers) associated with an account and used to service the account and provide a software application in a cloud computing environment. In one embodiment, the re-stacking data visualization display shows a listing of instances associated with a specific account/application in the cloud computing environment. For each listed instance, a launch date for the instance, a termination date for the instance, an indication of the instance creation template used to generate that instance, and the base instance creation template release dates for each of the base instance creation templates associated with the application are displayed. As a result, the re-stacking policy associated with an account/software application offering can be readily determined by a simple examination of the re-stacking data visualization display and any potential security issues and vulnerabilities can be readily identified and addressed.

Consequently, disclosed herein is a technical solution to the long standing technical need in the cloud computing arts for providing an easy to understand visualization of re-stacking patterns to identify and evaluate re-stacking policies.

In accordance with one embodiment, a method and system for providing visualization of instance data to identify and evaluate re-stacking policies in a cloud computing environment includes obtaining access to historical instance operational data associated with one or more instances operating in a cloud computing environment. In one embodiment, each of the one or more instances is created using one of one or more instance creation templates. In one embodiment, each of the one or more instances is implemented in connection with an account and/or application being offered by an application provider through the cloud computing environment.

In accordance with one embodiment, an instance creation template of the one of one or more instance creation templates used to create each of the one or more instances is determined. In one embodiment, instance creation template data is then generated for each of the one or more instances indicating the instance creation template used to generate each instance of the one or more instances. In one embodiment, the instance creation template data for each instance is then associated with that instance.

In accordance with one embodiment, the instance operational data associated with each of the one or more instances is analyzed and processed to generate instance lifespan data for that instance. In one embodiment, the instance lifespan data indicates a launch date of the instance and a termination date for the instance.

In accordance with one embodiment, instance lifespan visualization data is generated for each of the one or more instances including data for generating an instance lifespan visualization graphic. In one embodiment, the instance lifespan visualization graphic includes an individual graphic representation of each of the one or more instances. In one embodiment, the graphic representation of each of the one or more instances indicates a launch date of the instance, a termination date for the instance, and an indication of the instance creation template used to generate that instance.

In accordance with one embodiment, access to base instance creation template release date data indicating a release date for each base instance creation template associated with the one or more instances is obtained. In one embodiment, the base instance creation template release date data is used to indicate base instance creation template release dates for each of the instance creation templates used to create the one or more instances in the instance lifespan visualization graphic. In this way, in one embodiment, the instance lifespan visualization graphic is transformed into a re-stacking data visualization graphic.

In accordance with one embodiment, the re-stacking data visualization graphic includes an individual graphic representation of each of the one or more instances indicating a launch date for the instance, a termination date for the instance, an indication of the instance creation template used to generate that instance, and the base instance creation template release dates for each of the base instance creation templates.

In accordance with one embodiment, the re-stacking data visualization graphic is then evaluated and provided to one or more parties.

The disclosed embodiments provide an efficient, effective, and highly adaptable solution to the long standing technical need in the cloud computing environment to provide for visualization of re-stacking patterns to identify and evaluate re-stacking policies. However, the disclosed method and system for providing visualization of instance data to identify and evaluate re-stacking policies in a cloud computing environment does not encompass, embody, or preclude other forms of innovation in the area of cloud computing security and re-stacking analysis.

In addition, the disclosed method and system for providing visualization of instance data to identify and evaluate re-stacking policies in a cloud computing environment is not related to any fundamental economic practice, fundamental data processing practice, mental steps, or pen and paper based solution. In fact, the disclosed embodiments are directed to providing solutions to relatively new problems associated with cloud computing, re-stacking, cloud vulnerability analysis, and the processing and visualization of large amounts of data, i.e., "big data." Consequently, the disclosed method and system for providing visualization of instance data to identify and evaluate re-stacking policies in a cloud computing environment is not directed to, does not encompass, and is not merely, an abstract idea or concept.

In addition, the disclosed method and system for providing visualization of instance data to identify and evaluate re-stacking policies in a cloud computing environment provides for significant improvements to the technical fields of cloud computing, data security, vulnerability management, and software application implementation.

In addition, by allowing for a simple visual analysis of re-stacking patterns, the disclosed method and system for providing visualization of instance data to identify and evaluate re-stacking policies in a cloud computing environment provides for a more rapid response to security issues and application vulnerabilities, as well as fewer requests for data, data transfers, and data analysis.

Consequently, use of the disclosed method and system for providing visualization of instance data to identify and evaluate re-stacking policies in a cloud computing environment results in more efficient use of human and non-human resources, fewer processor cycles being utilized, reduced memory utilization, and less communications bandwidth being utilized to relay data to, and from, backend systems and client systems. As a result, computing systems are transformed into faster, more efficient, and more effective computing systems by implementing the method and system for providing visualization of instance data to identify and evaluate re-stacking policies in a cloud computing environment.

Figure 1:
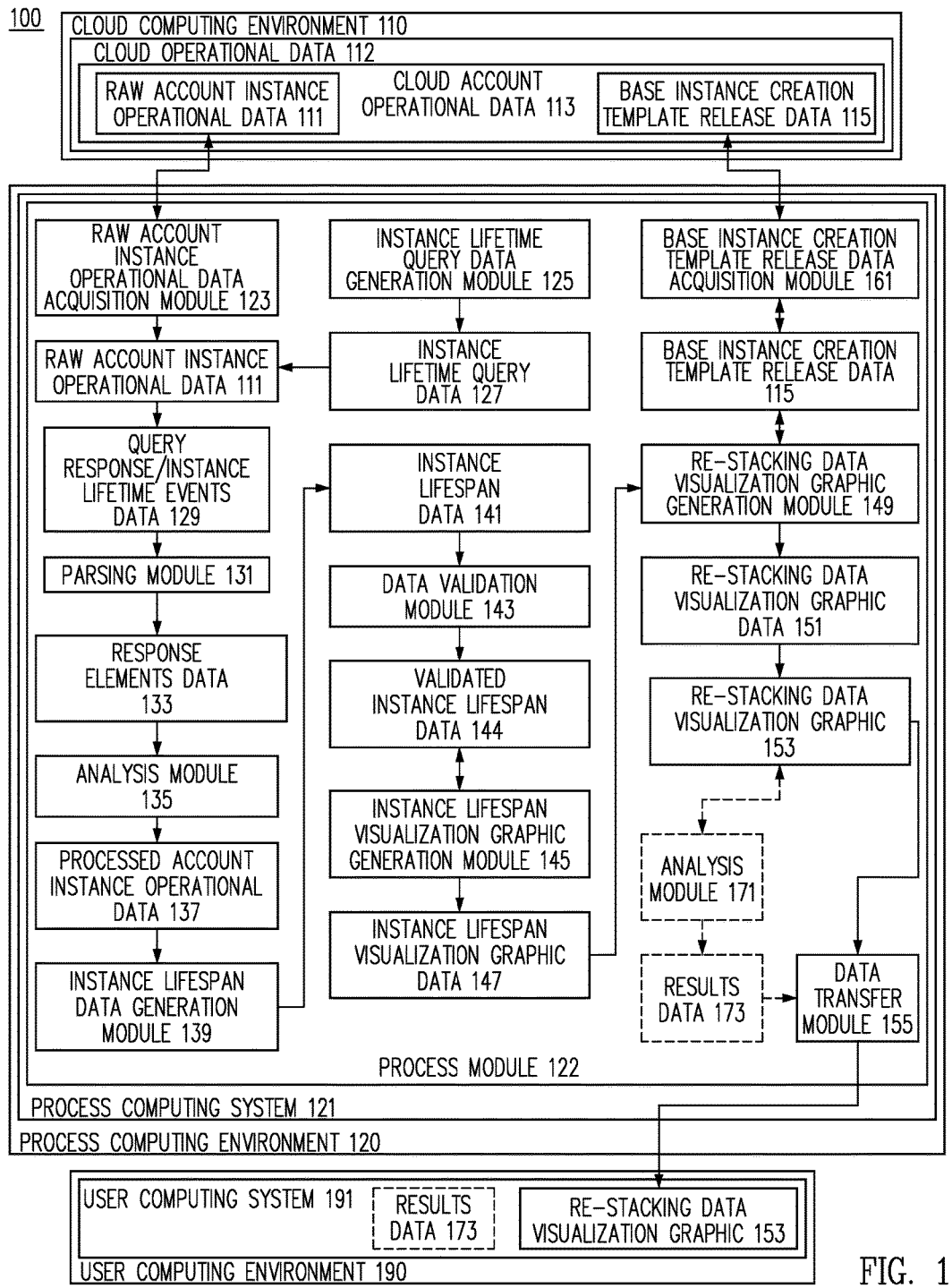
FIG. 1 is a high-level and functionality-based block diagram of a hardware and production environment or providing visualization of instance data to identify and evaluate re-stacking policies in a cloud computing environment, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

Term Definitions

Herein, the terms "application," "software system," and "software application" are used interchangeably and can be, but are not limited to: any data management system implemented and/or accessed, in whole or in part, in a cloud computing environment, on a computing system, accessed through one or more servers, accessed through a network, and/or otherwise accessed through a network; implemented and/or accessed, in whole or in part, on a computing system, desktop system, mobile system, and/or wearable device as provided through any system or by any mechanism and/or process, as discussed herein, and/or as known in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment;

and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

Herein, the term "party," "user," "user consumer," and "customer" are used interchangeably to denote any party and/or entity that interfaces with, and/or to whom information is provided by, the method and system for providing visualization of instance data to identify and evaluate re-stacking policies in a cloud computing environment described herein, and/or a person and/or entity that interfaces with, and/or to whom information is provided by, the method and system for providing visualization of instance data to identify and evaluate re-stacking policies in a cloud computing environment described herein, and/or a legal guardian of person and/or entity that interfaces with, and/or to whom information is provided by, the method and system for providing visualization of instance data to identify and evaluate re-stacking policies in a cloud computing environment described herein, and/or an authorized agent of any party and/or person and/or entity that interfaces with, and/or to whom information is provided by, the method and system for providing visualization of instance data to identify and evaluate re-stacking policies in a cloud computing environment described herein. For instance, in various embodiments, a user can be, but is not limited to, a person, a commercial entity, an application, a service, and/or a computing system.

As used herein, the term "instance creation template" is used to denote a special type of virtual appliance that is used to create a virtual machine (instance) within a cloud computing environment. A specific illustrative example of an instance creation template is an Amazon Machine Image (AMI).

As used herein, the term "Amazon Machine Image (AMI)" is used to denote a special type of instance creation template that is a virtual appliance used to create a virtual machine within the Amazon Elastic Compute Cloud ("EC2"). An AMI serves as the basic unit of deployment for services delivered using EC2.

As used herein, the term Relational Database Service (RDS) denotes a service for setting up, operating, and scaling a relational database in the cloud. One specific illustrative example of an RDS is the Amazon Relational Database Service (Amazon RDS) which is a web service that makes it easier to set up, operate, and scale a relational database in the cloud, provides resizable capacity for an industry-standard relational database, and manages common database administration tasks.

As used herein, the term "re-stacking" refers to the practice of terminating one or more instances associated with an application or client in a cloud computing environment and then activating new "replacement" instances associated with the application or client in a cloud computing environment. There are multiple reasons and occasions making re-stacking desirable. One specific illustrative example of a reason to perform a re-stacking operation is to terminate instances built on an old instance creation template, such as an old base AMI, and bring up replacement instances based on a new instance creation template, such as a new base AMI. This is particularly desirable when the new base instance creation template is released to fix vulnerabilities discovered in the old instance creation template.

DETAILED DISCLOSURE

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a re-stacking data visualization display is generated that includes individual graphic representations of instances associated with an account and used to provide a software application in a cloud computing environment. In one embodiment, the re-stacking data visualization display shows a launch date for each instance, a termination date for the instance, an indication of the instance creation template used to generate that instance, and the base instance creation template release dates for each of the base instance creation templates. As a result, the re-stacking policy or pattern associated with a software application offering can be readily determined by a simple examination of the re-stacking data visualization display and any potential security issues and vulnerabilities can be readily identified and easily addressed.

Consequently, disclosed herein is a technical solution to the long standing technical need in the cloud computing arts for providing an easy to understand visualization of re-stacking patterns to identify and evaluate re-stacking policies.

In accordance with one embodiment, a method and system for providing visualization of instance data to identify and evaluate re-stacking policies in a cloud computing environment includes obtaining access to historical instance operational data associated with one or more instances operating in a cloud computing environment.

In one embodiment, each of the one or more instances is created using one of one or more instance creation templates. As noted above, instance creation templates include a special type of virtual appliance that is used to create a virtual machine (instance) within a cloud computing environment. A specific illustrative example of an instance creation template is an Amazon Machine Image (AMI). As also noted above, an AMI is a special type of instance creation template used to create a virtual machine within the Amazon Web Services cloud computing environment, and, in particular, in the Amazon Elastic Compute Cloud ("EC2"). An AMI serves as the basic unit of deployment for services delivered using EC2.

In one embodiment, each of the one or more instances is implemented in connection with a given account to service that account, and/or implement an application being offered by an account owner/application provider through the cloud computing environment.

In one embodiment, instance lifespan data for each of the instances determined to be associated with the account/application, is determined using an instance lifespan determination algorithm.

In one embodiment, the instance lifespan determination algorithm includes first obtaining raw instance operational data associated with a given account/application in a cloud computing environment, also referred to herein as raw account instance operational data. In one embodiment, the raw instance operational data is obtained from an AWS computing environment using a Relational Database Service (RDS), such as, but not limited to, the Amazon Relational Database Service and the Amazon Cloud Trail Service.

In one embodiment, once access to the raw instance operational data is obtained, an instance lifetime query is generated to identify lifetime events associated with the instances. In one embodiment, the instance lifetime query includes requests for one or more of the following: run dates for the instances, termination dates for the instances, start times for the instances, and stop times for the instances.

In one embodiment, in response to the instance lifetime query, instance events data representing a list of events associated with the instances is generated and provided. In one embodiment, the instance events data is then parsed to determine one or more of: the account identification associated with each of the instances, the user, the event name, and the event time.

In one embodiment, response elements data is then generated that includes, for each instance, the instance creation template data for each of the one or more instances, e.g., the instance image data, indicating which instance creation template was used to generate each instance of the one or more instances. In one embodiment, the instance creation template data for each instance is associated with that instance.

In one embodiment, the instance creation template data includes image data indicating the AMI identification for the AMI used to create the instance, the launch time of the instance, and the termination time associated with the instance.

In accordance with one embodiment, the response elements data is then stored in collections of maps, lists, and sets. In accordance with one embodiment, the response elements data is then analyzed to generate processed instance operational data associated with each of the one or more instances. In one embodiment, the generation of the processed instance operational data includes the creation of instance lifespan objects and the instance events indicated are reduced to instance identification data, the associated AMI creation data for each instance, the start time of each instance, and the end time of each instance.

In one embodiment, the processed instance operational data is then organized and processed to generate instance lifespan data for each instance. In one embodiment, the instance lifespan data for each instance is then validated using one or more data validation methods, such as any data validation methods discussed herein, known at the time of filing, or as developed after filing.

In one embodiment, the instance lifespan data is used to generate instance lifespan visualization data for each of the one or more instances including data for generating an instance lifespan visualization graphic.

In one embodiment, the instance lifespan visualization graphic includes individual graphic representations of each of the one or more instances. In one embodiment, the graphic representation of each of the one or more instances indicates a launch date of the instance, a termination date for the instance, and an indication of the instance creation template used to generate that instance.

In accordance with one embodiment, access to base instance creation template release date data indicating a release date for each base instance creation template associated with the one or more instances is obtained. In one embodiment, the base instance creation template release date data is used to indicate base instance creation template release dates for each of the instance creation templates used to create the one or more instances in the instance lifespan visualization graphic. In this way, in one embodiment, the instance lifespan visualization graphic is transformed into a re-stacking data visualization graphic.

In accordance with one embodiment, the re-stacking data visualization graphic includes an individual graphic representation of each of the one or more instances indicating a launch date for the instance, a termination date for the instance, an indication of the instance creation template used to generate that instance, and the base instance creation template release dates for each of the base instance creation templates.

In accordance with one embodiment, the re-stacking data visualization graphic is evaluated and provided to one or more parties. In accordance with one embodiment, one or both of the re-stacking data visualization graphic and the re-stacking data visualization graphic data is further analyzed to identify security vulnerabilities and re-stacking policy analysis and results data is generated. In one embodiment, the account owner/provider of the software application is provided the re-stacking policy analysis and results data and/or is informed of the analysis results.

FIG. 1 is a high-level functionality-based block diagram of a hardware and production environment 100 for providing visualization of instance data to identify and evaluate re-stacking policies in a cloud computing environment, in accordance with one embodiment.

As seen in FIG. 1, in this specific illustrative example, production environment 100 includes: CLOUD COMPUTING ENVIRONMENT 110; PROCESS COMPUTING ENVIRONMENT 120, including PROCESS COMPUTING SYSTEM 121, and USER COMPUTING ENVIRONMENT 190, including USER COMPUTING SYSTEM 191.

As seen in FIG. 1, CLOUD COMPUTING ENVIRONMENT 110 includes CLOUD OPERATIONAL DATA 112 and CLOUD ACCOUNT OPERATIONAL DATA 113.

In one embodiment, CLOUD OPERATIONAL DATA 112 includes historical operational data associated with all of CLOUD COMPUTING ENVIRONMENT 110 and CLOUD ACCOUNT OPERATIONAL DATA 113 includes historical operational data associated with one or more instances operating in a CLOUD COMPUTING ENVIRONMENT 110.

In one embodiment, each of the one or more instances indicated in CLOUD ACCOUNT OPERATIONAL DATA 113 is created using one of one or more instance creation templates. As noted above, instance creation templates include a special type of virtual appliance that is used to create a virtual machine (instance) within a cloud computing environment. A specific illustrative example of an instance creation template is an Amazon Machine Image (AMI).

In one embodiment, and as discussed in more detail below, INSTANCE LIFESPAN DATA 141 is determined using an instance lifespan determination algorithm. In one embodiment, the instance lifespan determination algorithm includes first obtaining RAW ACCOUNT INSTANCE OPERATIONAL DATA 111 from CLOUD ACCOUNT OPERATIONAL DATA 113.

In one embodiment, RAW ACCOUNT INSTANCE OPERATIONAL DATA 111 is obtained from an AWS computing environment using a Relational Database Service (RDS), such as, but not limited to, the Amazon Relational Database Service and the Amazon Cloud Trail Service.

In one embodiment, PROCESS COMPUTING SYSTEM 121 includes PROCESS MODULE 122 for implementing the instance lifespan determination algorithm. In one embodiment, access to the RAW ACCOUNT INSTANCE OPERATIONAL DATA 111 is obtained PROCESS MODULE 122 via RAW ACCOUNT INSTANCE OPERATIONAL DATA ACQUISITION MODULE 123.

In one embodiment, INSTANCE LIFETIME QUERY DATA GENERATION MODULE 125 generates INSTANCE LIFETIME QUERY DATA 127. In one embodiment, the instance lifetime query of INSTANCE LIFETIME QUERY DATA 127 seeks to identify lifetime events associated with the instances of RAW ACCOUNT INSTANCE OPERATIONAL DATA 111. In one embodiment, the instance lifetime query of INSTANCE LIFETIME QUERY DATA 127 includes requests for one or more of the following: run dates for the instances, termination dates for the instances, start times for the instances, and stop times for the instances.

In one embodiment, in response to the instance lifetime query of INSTANCE LIFETIME QUERY DATA 127, QUERY RESPONSE/INSTANCE LIFETIME EVENTS DATA 129 is generated representing a list of events associated with the instances. In one embodiment, the QUERY RESPONSE/INSTANCE LIFETIME EVENTS DATA 129 is then parsed by PARSING MODULE 131 to determine one or more of: the account identification associated with each of the instances, the user, the event name, and the event time.

In one embodiment, RESPONSE ELEMENTS DATA 133 is thereby generated that includes, for each instance, the instance creation template data for each of the one or more instances, e.g., the instance image data, indicating which instance creation template was used to generate each instance of the one or more instances. In one embodiment, the instance creation template data for each instance is associated with that instance.

In one embodiment, the instance creation template data includes image data indicating the AMI identification for the AMI used to create the instance, the launch time of the instance, and the termination time associated with the instance.

In accordance with one embodiment, RESPONSE ELEMENTS DATA 133 is stored in collections of maps, lists, and sets (not shown in FIG. 1). In accordance with one embodiment, RESPONSE ELEMENTS DATA 133 is then analyzed by ANALYSIS MODULE 135 to generate PROCESSED ACCOUNT INSTANCE OPERATIONAL DATA 137 associated with each of the one or more instances. In one embodiment, the generation of PROCESSED ACCOUNT INSTANCE OPERATIONAL DATA 137 includes the creation of instance lifespan objects (not shown in FIG. 1) and the instance events indicated are reduced to instance identification data, the associated AMI creation data for each instance, the start time of each instance, and the end time of each instance.

In one embodiment, PROCESSED ACCOUNT INSTANCE OPERATIONAL DATA 137 is then organized and processed by INSTANCE LIFESPAN DATA GENERATION MODULE 139 to generate INSTANCE LIFESPAN DATA 141 for each instance. In one embodiment, INSTANCE LIFESPAN DATA 141 for each instance is then validated at DATA VALIDATION MODULE 143 using one or more data validation methods, such as any data validation methods discussed herein, known at the time of filing, or as developed after filing, to generate VALIDATED INSTANCE LIFESPAN DATA 144.

In one embodiment, at INSTANCE LIFESPAN VISUALIZATION GRAPHIC GENERATION MODULE 145, VALIDATED INSTANCE LIFESPAN DATA 144 is used to generate INSTANCE LIFESPAN VISUALIZATION GRAPHIC DATA 147 for generating an instance lifespan visualization graphic, such as instance lifespan visualization graphic 301 of FIG. 3A discussed below. In one embodiment, the instance lifespan visualization graphic includes individual graphic representations of each of the one or more instances. In one embodiment, the graphic representation of each of the one or more instances indicates a launch date of the instance, a termination date for the instance, and an indication of the instance creation template used to generate that instance.

In accordance with one embodiment, access to BASE INSTANCE CREATION TEMPLATE RELEASE DATA 115 indicating a release date for each base instance creation template associated with the one or more instances is obtained by BASE INSTANCE CREATION TEMPLATE RELEASE DATA ACQUISITION MODULE 161, in one embodiment, from CLOUD ACCOUNT OPERATIONAL DATA 113.

In one embodiment, INSTANCE LIFESPAN VISUALIZATION GRAPHIC DATA 147 and BASE INSTANCE CREATION TEMPLATE RELEASE DATA 115 are provided to RE-STACKING DATA VISUALIZATION GRAPHIC GENERATION MODULE 149 and BASE INSTANCE CREATION TEMPLATE RELEASE DATA 115 is used to indicate base instance creation template release dates for each of the instance creation templates used to create the one or more instances in the instance lifespan visualization graphic of INSTANCE LIFESPAN VISUALIZATION GRAPHIC DATA 147. In this way, in one embodiment, INSTANCE LIFESPAN VISUALIZATION GRAPHIC DATA 147 is transformed into RE-STACKING DATA VISUALIZATION GRAPHIC DATA 151.

In accordance with one embodiment, RE-STACKING DATA VISUALIZATION GRAPHIC DATA 151 is used to generate RE-STACKING DATA VISUALIZATION GRAPHIC 153. In one embodiment RE-STACKING DATA VISUALIZATION GRAPHIC 153 includes an individual graphic representation of each of the one or more instances indicating a launch date for the instance, a termination date for the instance, an indication of the instance creation template used to generate that instance, and the base instance creation template release dates for each of the base instance creation templates.

In accordance with one embodiment, RE-STACKING DATA VISUALIZATION GRAPHIC DATA 151 and/or RE-STACKING DATA VISUALIZATION GRAPHIC 153 is provided to USER COMPUTING SYSTEM 191 in USER COMPUTING ENVIRONMENT 190 through DATA TRANSFER MODULE 155 and thereby provided to one or more parties.

In accordance with one embodiment, RE-STACKING DATA VISUALIZATION GRAPHIC DATA 151 and/or RE-STACKING DATA VISUALIZATION GRAPHIC 153 is/are optionally evaluated by analysis module ANALYSIS MODULE 171 to identify security vulnerabilities and RESULTS DATA 173 is generated. In one embodiment, RESULTS DATA 173 is then provided to USER COMPUTING SYSTEM 191 in USER COMPUTING ENVIRONMENT 190 through DATA TRANSFER MODULE 155 and thereby provided to one or more parties.

The disclosed embodiments provide an efficient, effective, and highly adaptable solution to the long standing technical need in the cloud computing environment to provide for visualization of re-stacking patterns to identify and evaluate re-stacking policies. However, the disclosed method and system for providing visualization of instance data to identify and evaluate re-stacking policies in a cloud computing environment does not encompass, embody, or preclude other forms of innovation in the area of cloud computing security or re-stacking analysis.

In addition, the disclosed method and system for providing visualization of instance data to identify and evaluate re-stacking policies in a cloud computing environment is not related to any fundamental economic practice, fundamental data processing practice, mental steps, or pen and paper based solution. In fact, the disclosed embodiments are directed to providing solutions to the relatively new problems associated with cloud computing, re-stacking, cloud vulnerability analysis, and the processing and visualization of large amounts of data, i.e., "big data." Consequently, the disclosed method and system for providing visualization of instance data to identify and evaluate re-stacking policies in a cloud computing environment is not directed to, does not encompass, and is not merely, an abstract idea or concept.

In addition, the disclosed method and system for providing visualization of instance data to identify and evaluate re-stacking policies in a cloud computing environment provides for significant improvements to the technical fields of cloud computing, data security, vulnerability management, and software application implementation.

In addition, by allowing for a simple visual analysis of re-stacking patterns, the disclosed method and system for providing visualization of instance data to identify and evaluate re-stacking policies in a cloud computing environment provides for a more rapid response to security issues and application vulnerabilities, as well as fewer requests for data, data transfers, and data analysis.

Consequently, use of the disclosed method and system for providing visualization of instance data to identify and evaluate re-stacking policies in a cloud computing environment results in more efficient use of human and non-human resources, fewer processor cycles being utilized, reduced memory utilization, and less communications bandwidth being utilized to relay data to, and from, backend systems and client systems.

As a result, computing systems are transformed into faster, more efficient, and more effective computing systems by implementing the method and system for providing visualization of instance data to identify and evaluate re-stacking policies in a cloud computing environment.

Process

In accordance with one embodiment, a re-stacking data visualization display is generated that includes individual graphic representations of instances associated with an account used to provide a software application/service in a cloud computing environment. In one embodiment, the re-stacking data visualization display shows a launch date for each instance, a termination date for the instance, an indication of the instance creation template used to generate that instance, and the base instance creation template release dates for each of the base instance creation templates. As a result, the re-stacking policy associated with an account and/or software application offering can be readily determined by a simple examination of the re-stacking data visualization display and any potential security issues and vulnerabilities can be readily identified and easily addressed.

Consequently, disclosed herein is a technical solution to the long standing technical need in the cloud computing arts for providing an easy to understand visualization of re-stacking patterns to identify and evaluate re-stacking policies.

Figure 2:
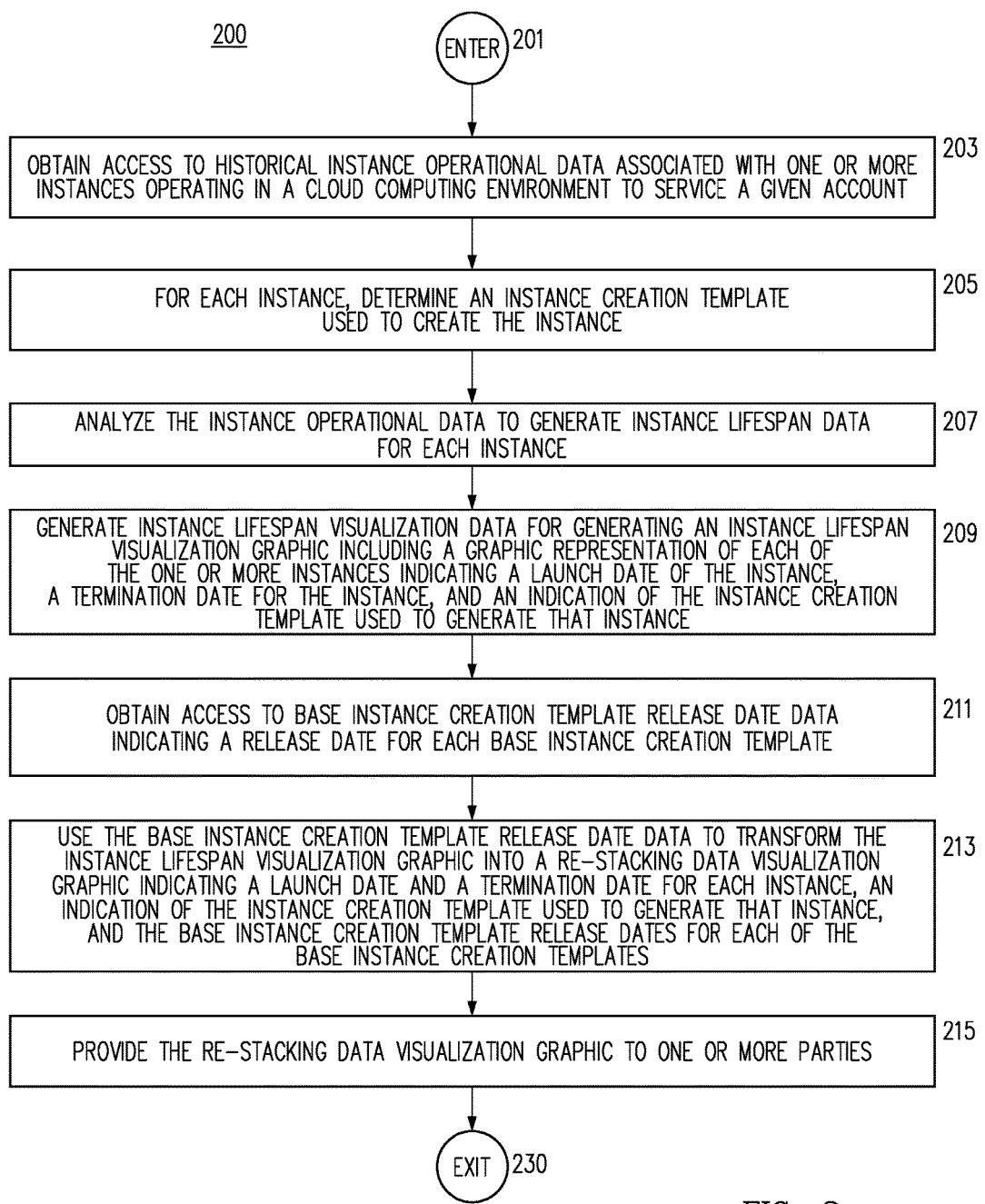
FIG. 2 is a flow chart representing one example of a generalized process method and system for providing visualization of instance data to identify and evaluate re-stacking policies in a cloud computing environment, in accordance with one embodiment.

FIG. 2 is a flow chart representing one example of a generalized process 200 for providing visualization of instance data to identify and evaluate re-stacking policies in a cloud computing environment, in accordance with one embodiment.

In one embodiment, process 200 for providing visualization of instance data to identify and evaluate re-stacking policies in a cloud computing environment begins at ENTER OPERATION 201 and process flow proceeds to OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT OPERATION 203.

In one embodiment, at OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT OPERATION 203, access to historical instance operational data associated with one or more instances operating in a cloud computing environment is obtained.

In one embodiment, an instance lifespan determination algorithm is implemented that includes first obtaining raw instance operational data associated with a given account/application in a cloud computing environment at OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT OPERATION 203.

In one embodiment, at OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT OPERATION 203, the raw instance operational data is obtained from an AWS computing environment using a Relational Database Service (RDS), such as, but not limited to, the Amazon Relational Database Service and the Amazon Cloud Trail Service.

In one embodiment, each of the one or more instances of OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT OPERATION 203 is implemented in connection with a given account, and/or application being offered by an account owner/application provider through the cloud computing environment.

In one embodiment, each of the one or more instances of OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT OPERATION 203 is created using one of one or more instance creation templates.

In one embodiment, once access to historical instance operational data associated with one or more instances operating in a cloud computing environment is obtained at OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT OPERATION 203, process flow proceeds to FOR EACH INSTANCE, DETERMINE AN INSTANCE CREATION TEMPLATE USED TO CREATE THE INSTANCE OPERATION 205.

In one embodiment, at FOR EACH INSTANCE, DETERMINE AN INSTANCE CREATION TEMPLATE USED TO CREATE THE INSTANCE OPERATION 205 instance creation template data for each of the one or more instances of OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT OPERATION 203, e.g., the instance image data, indicating which instance creation template was used to generate each instance of the one or more instances is determined.

As noted above, in one embodiment, instance lifespan data for each of the instances determined to be associated with the account/application of OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT OPERATION 203, is determined using an instance lifespan determination algorithm.

In one embodiment, at FOR EACH INSTANCE, DETERMINE AN INSTANCE CREATION TEMPLATE USED TO CREATE THE INSTANCE OPERATION 205 the instance lifespan determination algorithm generates an instance lifetime query to identify lifetime events associated with the instances of OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT OPERATION 203.

In one embodiment, the instance lifetime query includes requests for one or more of the following: run dates for the instances, termination dates for the instances, start times for the instances, and stop times for the instances.

In one embodiment, in response to the instance lifetime query, instance events data representing a list of events associated with the instances is generated and provided. In one embodiment, the instance events data is then parsed to determine one or more of: the account identification associated with each of the instances, the user, the event name, and the event time.

In one embodiment, at FOR EACH INSTANCE, DETERMINE AN INSTANCE CREATION TEMPLATE USED TO CREATE THE INSTANCE OPERATION 205, response elements data is generated that includes, for each instance, the instance creation template data that is then associated with/correlated to that instance.

As noted above, instance creation templates include a special type of virtual appliance that is used to create a virtual machine (instance) within a cloud computing environment. A specific illustrative example of an instance creation template is an Amazon Machine Image (AMI). As also noted above, an AMI is a special type of instance creation template used to create a virtual machine within the Amazon Web Services cloud computing environment, and, in particular, in the Amazon Elastic Compute Cloud ("EC2"). An AMI serves as the basic unit of deployment for services delivered using EC2.

In one embodiment, the instance creation template data of FOR EACH INSTANCE, DETERMINE AN INSTANCE CREATION TEMPLATE USED TO CREATE THE INSTANCE OPERATION 205 includes image data indicating the AMI identification for the AMI used to create the instance, the launch time of the instance, and the termination time associated with the instance.

In one embodiment, once instance creation template data for each of the one or more instances indicating which instance creation template was used to generate each instance of the one or more instances is determined at FOR EACH INSTANCE, DETERMINE AN INSTANCE CREATION TEMPLATE USED TO CREATE THE INSTANCE OPERATION 205, process flow proceeds to ANALYZE THE INSTANCE OPERATIONAL DATA TO GENERATE INSTANCE LIFESPAN DATA FOR EACH INSTANCE OPERATION 207.

In one embodiment, at ANALYZE THE INSTANCE OPERATIONAL DATA TO GENERATE INSTANCE LIFESPAN DATA FOR EACH INSTANCE OPERATION 207, the instance operational data is analyzed to generate instance lifespan data for each of the instances of OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT OPERATION 203.

As noted above, in one embodiment, an instance lifetime query is generated by the instance lifespan determination algorithm. In one embodiment, at ANALYZE THE INSTANCE OPERATIONAL DATA TO GENERATE INSTANCE LIFESPAN DATA FOR EACH INSTANCE OPERATION 207, the instance lifetime query generated by the instance lifespan determination algorithm includes requests for one or more of the following: run dates for the instances, termination dates for the instances, start times for the instances, and stop times for the instances.

In one embodiment, at ANALYZE THE INSTANCE OPERATIONAL DATA TO GENERATE INSTANCE LIFESPAN DATA FOR EACH INSTANCE OPERATION 207, in response to the instance lifetime query, instance events data representing a list of events associated with the instances is generated and provided. In one embodiment, at ANALYZE THE INSTANCE OPERATIONAL DATA TO GENERATE INSTANCE LIFESPAN DATA FOR EACH INSTANCE OPERATION 207, the instance events data is parsed to determine one or more of: the account identification associated with each of the instances, the user, the event name, and the event time.

In accordance with one embodiment, at ANALYZE THE INSTANCE OPERATIONAL DATA TO GENERATE INSTANCE LIFESPAN DATA FOR EACH INSTANCE OPERATION 207 the response elements data is then stored in collections of maps, lists, and sets.

In one embodiment, at ANALYZE THE INSTANCE OPERATIONAL DATA TO GENERATE INSTANCE LIFESPAN DATA FOR EACH INSTANCE OPERATION 207 instance lifespan objects are created and the instance events indicated are reduced to instance identification data, the associated AMI creation data for each instance, the start time of each instance, and the end time of each instance.

In one embodiment, at ANALYZE THE INSTANCE OPERATIONAL DATA TO GENERATE INSTANCE LIFESPAN DATA FOR EACH INSTANCE OPERATION 207 the processed instance operational data is then organized and processed to generate instance lifespan data for each instance. In one embodiment, at ANALYZE THE INSTANCE OPERATIONAL DATA TO GENERATE INSTANCE LIFESPAN DATA FOR EACH INSTANCE OPERATION 207 the instance lifespan data for each instance is then validated using one or more data validation methods, such as any data validation methods discussed herein, known at the time of filing, or as developed after filing.

In one embodiment, once instance operational data is obtained and analyzed to generate instance lifespan data for each of the instances at ANALYZE THE INSTANCE OPERATIONAL DATA TO GENERATE INSTANCE LIFESPAN DATA FOR EACH INSTANCE OPERATION 207, process flow proceeds to GENERATE INSTANCE LIFESPAN VISUALIZATION DATA FOR GENERATING AN INSTANCE LIFESPAN VISUALIZATION GRAPHIC INCLUDING AN INDIVIDUAL GRAPHIC REPRESENTATION OF EACH OF THE ONE OR MORE INSTANCES INDICATING A LAUNCH DATE OF THE INSTANCE, A TERMINATION DATE FOR THE INSTANCE, AND AN INDICATION OF THE INSTANCE CREATION TEMPLATE USED TO GENERATE THAT INSTANCE OPERATION 209.

In one embodiment, at GENERATE INSTANCE LIFESPAN VISUALIZATION DATA FOR GENERATING AN INSTANCE LIFESPAN VISUALIZATION GRAPHIC INCLUDING AN INDIVIDUAL GRAPHIC REPRESENTATION OF EACH OF THE ONE OR MORE INSTANCES INDICATING A LAUNCH DATE OF THE INSTANCE, A TERMINATION DATE FOR THE INSTANCE, AND AN INDICATION OF THE INSTANCE CREATION TEMPLATE USED TO GENERATE THAT INSTANCE OPERATION 209, the instance lifespan data of ANALYZE THE INSTANCE OPERATIONAL DATA TO GENERATE INSTANCE LIFESPAN DATA FOR EACH INSTANCE OPERATION 207 is used to generate instance lifespan visualization data for each of the one or more instances of OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT OPERATION 203 including data for generating an instance lifespan visualization graphic.

In one embodiment, the instance lifespan visualization graphic of GENERATE INSTANCE LIFESPAN VISUALIZATION DATA FOR GENERATING AN INSTANCE LIFESPAN VISUALIZATION GRAPHIC INCLUDING AN INDIVIDUAL GRAPHIC REPRESENTATION OF EACH OF THE ONE OR MORE INSTANCES INDICATING A LAUNCH DATE OF THE INSTANCE, A TERMINATION DATE FOR THE INSTANCE, AND AN INDICATION OF THE INSTANCE CREATION TEMPLATE USED TO GENERATE THAT INSTANCE OPERATION 209 includes an individual graphic representation of each of the one or more instances of OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT OPERATION 203.

In one embodiment, the graphic representation of each of the one or more instances of GENERATE INSTANCE LIFESPAN VISUALIZATION DATA FOR GENERATING AN INSTANCE LIFESPAN VISUALIZATION GRAPHIC INCLUDING AN INDIVIDUAL GRAPHIC REPRESENTATION OF EACH OF THE ONE OR MORE INSTANCES INDICATING A LAUNCH DATE OF THE INSTANCE, A TERMINATION DATE FOR THE INSTANCE, AND AN INDICATION OF THE INSTANCE CREATION TEMPLATE USED TO GENERATE THAT INSTANCE OPERATION 209 indicates a launch date of the instance, a termination date for the instance, and an indication of the instance creation template used to generate that instance.

Figure 3A:
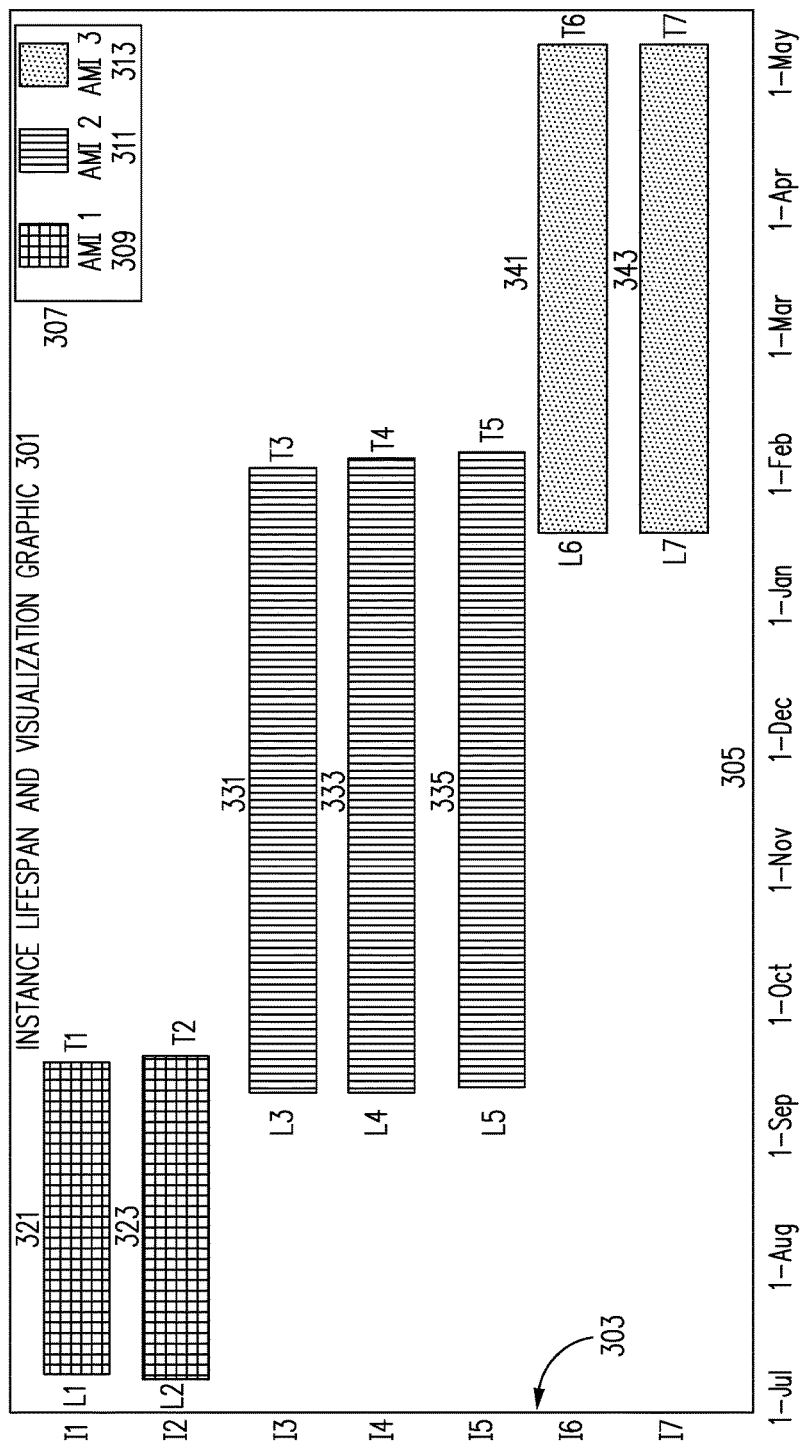
FIG. 3A is a simplified representation of an instance lifespan visualization graphic in accordance with one embodiment.

FIG. 3A is a simplified representation of an instance lifespan visualization graphic 301 in accordance with one embodiment. As seen in FIG. 3A, in this specific simplified illustrative example, instance lifespan visualization graphic 301 includes a listing of instance identification data I1, I2, I3, I4, I5, I6 and I7 associated with each of the one or more instances along a first axis, in this particular example the vertical axis 303, and a date timeline associated with the instance lifespans along a second axis, in this particular example the horizontal axis 305.

As also seen in FIG. 3A, in this specific simplified illustrative example, instance lifespan visualization graphic 301 includes: each of the one or more instances I1, I2, I3, I4, I5, I6 and I7 represented by an individual instance lifespan graphic 321, 323, 331, 333, 335, 341, and 343, respectively, correlated to the instance identification data listings, I1, I2, I3, I4, I5, I6 and I7, respectively; the launch dates for each instance I1, I2, I3, I4, I5, I6 and I7 of L1, L2, L3, L4, L5, L6, and L7, respectively, correlated to the date timeline of the horizontal axis 305; and the termination dates for each instance I1, I2, I3, I4, I5, I6 and I7 of T1, T2, T3, T4, T5, T6, and T7, respectively, also correlated to the date timeline of the horizontal axis 305.

In addition, as also seen in FIG. 3A, in this specific simplified illustrative example, the particular instance creation template, in this example the AMI, used to generate each of the instances I1, I2, I3, I4, I5, I6 and I7 is indicated by the fill pattern of the individual instance lifespan graphics 321, 323, 331, 333, 335, 341, and 343, respectively. As seen in FIG. 3A, in this specific simplified illustrative example, three fill patterns 309, 311, and 313 in table 307 correspond to AMI1, AMI2, and AMI3, respectively. Consequently, in this specific simplified illustrative example, instances I1 and I2 are shown as having been created on AMI1, instances I3, I4, and I5 are shown as having been created on AMI2, and instances I6 and I7 are shown as having been created on AMI3.

Consequently, instance lifespan visualization graphic 301 conveys information regarding, how many instances are associated with an account, the identification data for those instances, the launch dates for the instances, the termination dates for the instances, and the instance creation templates used to create the instances, all in a single, easily interpreted graphic display.

Referring back to FIG. 3A, a quick viewing of instance lifespan visualization graphic 301 conveys the fact that around July 7, instances I1 and I2 were launched based on AMI1. Then, around September 21 instances I1 and I2 were terminated and instances I3, I4, and I5, were launched around September 14, presumably as replacements for instances I1 and I2, with an added instance I5. As also seen in FIG. 3A, around February 2, instances I3, I4, and I5 were terminated and around January 20, instances I6 and I7 were launched, presumably as replacements for instances I3, I4, and I5.

As discussed below, the inventors have discovered that this type of cascading launching, termination, and launching pattern is often indicative of a predefined re-stacking policy being implemented to service an account. However, without more data, and in particular without base instance creation template release dates, it is difficult to know exactly what prompted the re-stacking operations.

It is worth noting that while a fill pattern for each of the individual instance lifespan graphics 321, 323, 331, 333, 335, 341, and 343, i.e., the three fill patterns 309, 311, and 313, was used in the example of FIG. 3A to indicate the instance creation template used to create each of the instances I1, I2, I3, I4, I5, I6 and I7, in other embodiments, other visual features of the individual instance lifespan graphics associated with each of the one or more instances can be used to indicate the instance creation template used to generate that instance.

For instance, as another specific illustrative example, in one embodiment, a color of the individual instance lifespan graphics associated with each of the one or more instances can be used to indicate the instance creation template used to generate that instance.

As another specific illustrative example, in one embodiment, a shape of the individual instance lifespan graphics associated with each of the one or more instances can be used to indicate the instance creation template used to generate that instance.

In various other embodiments, any visual feature of the individual instance lifespan graphics associated with each of the one or more instances can be used to indicate the instance creation template used to generate that instance.

In one embodiment, once the instance lifespan data is used to generate instance lifespan visualization data for each of the one or more instances including data for generating an instance lifespan visualization graphic at GENERATE INSTANCE LIFESPAN VISUALIZATION DATA FOR GENERATING AN INSTANCE LIFESPAN VISUALIZATION GRAPHIC INCLUDING AN INDIVIDUAL GRAPHIC REPRESENTATION OF EACH OF THE ONE OR MORE INSTANCES INDICATING A LAUNCH DATE OF THE INSTANCE, A TERMINATION DATE FOR THE INSTANCE, AND AN INDICATION OF THE INSTANCE CREATION TEMPLATE USED TO GENERATE THAT INSTANCE OPERATION 209, process flow proceeds to OBTAIN ACCESS TO BASE INSTANCE CREATION TEMPLATE RELEASE DATE DATA INDICATING A RELEASE DATE FOR EACH BASE INSTANCE CREATION TEMPLATE OPERATION 211.

In one embodiment, at OBTAIN ACCESS TO BASE INSTANCE CREATION TEMPLATE RELEASE DATE DATA INDICATING A RELEASE DATE FOR EACH BASE INSTANCE CREATION TEMPLATE OPERATION 211, access to base instance creation template release date data indicating a release date for each base instance creation template associated with the one or more instances is obtained.

In one embodiment, the base instance creation template release date data is obtained at OBTAIN ACCESS TO BASE INSTANCE CREATION TEMPLATE RELEASE DATE DATA INDICATING A RELEASE DATE FOR EACH BASE INSTANCE CREATION TEMPLATE OPERATION 211 from operational log data maintained by the cloud computing environment provider. In one embodiment, the base instance creation template release date data is obtained from the AWS Cloud Trail Service.

In one embodiment, once access to base instance creation template release date data indicating a release date for each base instance creation template associated with the one or more instances is obtained at OBTAIN ACCESS TO BASE INSTANCE CREATION TEMPLATE RELEASE DATE DATA INDICATING A RELEASE DATE FOR EACH BASE INSTANCE CREATION TEMPLATE OPERATION 211, process flow proceeds to USE THE BASE INSTANCE CREATION TEMPLATE RELEASE DATE DATA TO TRANSFORM THE INSTANCE LIFESPAN VISUALIZATION GRAPHIC INTO A RE-STACKING DATA VISUALIZATION GRAPHIC INDICATING A LAUNCH DATE AND A TERMINATION DATE FOR EACH INSTANCE, AN INDICATION OF THE INSTANCE CREATION TEMPLATE USED TO GENERATE THAT INSTANCE, AND THE BASE INSTANCE CREATION TEMPLATE RELEASE DATES FOR EACH OF THE BASE INSTANCE CREATION TEMPLATES OPERATION 213.

In one embodiment, at USE THE BASE INSTANCE CREATION TEMPLATE RELEASE DATE DATA TO TRANSFORM THE INSTANCE LIFESPAN VISUALIZATION GRAPHIC INTO A RE-STACKING DATA VISUALIZATION GRAPHIC INDICATING A LAUNCH DATE AND A TERMINATION DATE FOR EACH INSTANCE, AN INDICATION OF THE INSTANCE CREATION TEMPLATE USED TO GENERATE THAT INSTANCE, AND THE BASE INSTANCE CREATION TEMPLATE RELEASE DATES FOR EACH OF THE BASE INSTANCE CREATION TEMPLATES OPERATION 213, the base instance creation template release date data of OBTAIN ACCESS TO BASE INSTANCE CREATION TEMPLATE RELEASE DATE DATA INDICATING A RELEASE DATE FOR EACH BASE INSTANCE CREATION TEMPLATE OPERATION 211 is used to transform the instance lifespan visualization graphic of GENERATE INSTANCE LIFESPAN VISUALIZATION DATA FOR GENERATING AN INSTANCE LIFESPAN VISUALIZATION GRAPHIC INCLUDING AN INDIVIDUAL GRAPHIC REPRESENTATION OF EACH OF THE ONE OR MORE INSTANCES INDICATING A LAUNCH DATE OF THE INSTANCE, A TERMINATION DATE FOR THE INSTANCE, AND AN INDICATION OF THE INSTANCE CREATION TEMPLATE USED TO GENERATE THAT INSTANCE OPERATION 209 into a re-stacking data visualization graphic.

In one embodiment, at USE THE BASE INSTANCE CREATION TEMPLATE RELEASE DATE DATA TO TRANSFORM THE INSTANCE LIFESPAN VISUALIZATION GRAPHIC INTO A RE-STACKING DATA VISUALIZATION GRAPHIC INDICATING A LAUNCH DATE AND A TERMINATION DATE FOR EACH INSTANCE, AN INDICATION OF THE INSTANCE CREATION TEMPLATE USED TO GENERATE THAT INSTANCE, AND THE BASE INSTANCE CREATION TEMPLATE RELEASE DATES FOR EACH OF THE BASE INSTANCE CREATION TEMPLATES OPERATION 213, the base instance creation template release date data of OBTAIN ACCESS TO BASE INSTANCE CREATION TEMPLATE RELEASE DATE DATA INDICATING A RELEASE DATE FOR EACH BASE INSTANCE CREATION TEMPLATE OPERATION 211 is used to indicate base instance creation template release dates for each of the instance creation templates used to create the one or more instances in the instance lifespan visualization graphic on the instance lifespan visualization graphic of GENERATE INSTANCE LIFESPAN VISUALIZATION DATA FOR GENERATING AN INSTANCE LIFESPAN VISUALIZATION GRAPHIC INCLUDING AN INDIVIDUAL GRAPHIC REPRESENTATION OF EACH OF THE ONE OR MORE INSTANCES INDICATING A LAUNCH DATE OF THE INSTANCE, A TERMINATION DATE FOR THE INSTANCE, AND AN INDICATION OF THE INSTANCE CREATION TEMPLATE USED TO GENERATE THAT INSTANCE OPERATION 209.

In accordance with one embodiment, the re-stacking data visualization graphic of USE THE BASE INSTANCE CREATION TEMPLATE RELEASE DATE DATA TO TRANSFORM THE INSTANCE LIFESPAN VISUALIZATION GRAPHIC INTO A RE-STACKING DATA VISUALIZATION GRAPHIC INDICATING A LAUNCH DATE AND A TERMINATION DATE FOR EACH INSTANCE, AN INDICATION OF THE INSTANCE CREATION TEMPLATE USED TO GENERATE THAT INSTANCE, AND THE BASE INSTANCE CREATION TEMPLATE RELEASE DATES FOR EACH OF THE BASE INSTANCE CREATION TEMPLATES OPERATION 213 includes an individual graphic representation of each of the one or more instances indicating a launch date for the instance, a termination date for the instance, an indication of the instance creation template used to generate that instance, and the base instance creation template release dates for each of the base instance creation templates.

Figure 3B:
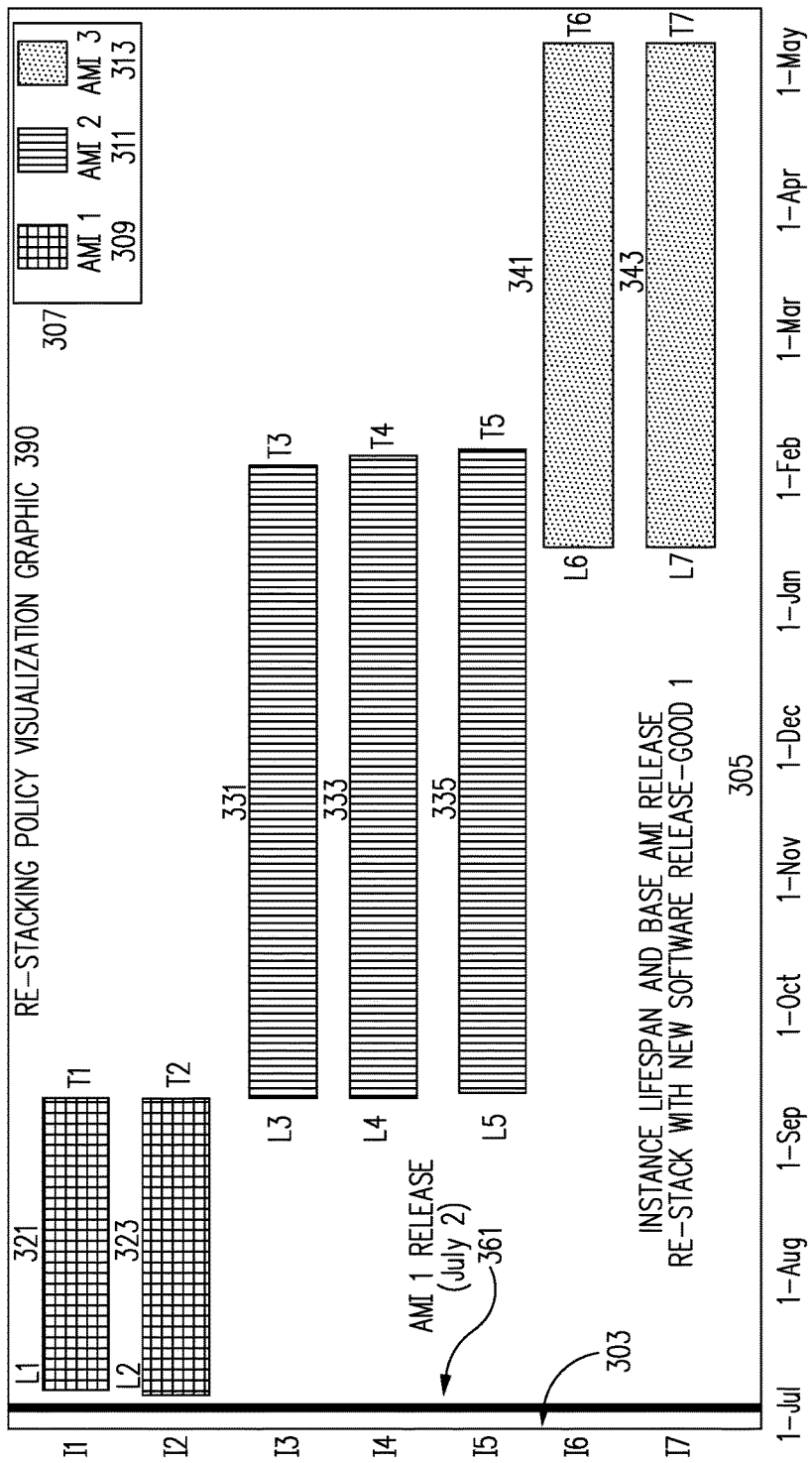
FIG. 3B is a simplified representation of re-stacking data visualization graphic in accordance with one embodiment indicating, in the specific example of FIG. 3B, a potentially "good" or "proper" re-stacking policy is being implemented based on software release dates.

FIG. 3B is a simplified representation of re-stacking data visualization graphic 390 in accordance with one embodiment. In this simplified illustrative example, FIG. 3B represents the instance lifespan visualization graphic 301 of FIG. 3A discussed above, with AMI1 release date visualization 361, the addition of which transforms instance lifespan visualization graphic 301 of FIG. 3A into re-stacking data visualization graphic 390 of FIG. 3B.

As noted above, re-stacking data visualization graphic 390, like instance lifespan visualization graphic 301, conveys information regarding, how many instances are associated with an account, the identification data for those instances, the launch dates for the instances, the termination dates for the instances, and the instance creation templates used to create the instances, all in a single, easily interpreted graphic display.

However, re-stacking data visualization graphic 390 also shows this information against the backdrop of AMI1 release date as indicated by AMI1 release date visualization 361. Consequently, re-stacking data visualization graphic 390 shows that the re-stacking represented in re-stacking data visualization graphic 390 was not performed in response to the release of new AMI1, sine the only AMI release was around July 2 and therefore before any of the instances shown were launched. Consequently, as the inventors have discovered, this type of non-AMI release correlated re-stacking represented in FIGS. 3A and 3B, is likely triggered not by any base AMI release, but by new software releases.

As seen in FIG. 3B, AMI1 release date visualization 361 is a visual vertical line representation of the base instance creation template release date of Jul. 2, 2016 correlated to the date timeline of the horizontal axis 305. However, in various other embodiments, one or more base instance creation template release dates are included in the re-stacking data visualization graphic as any visual representation of the base instance creation template release dates correlated to the date timeline axis.

Figure 3C:
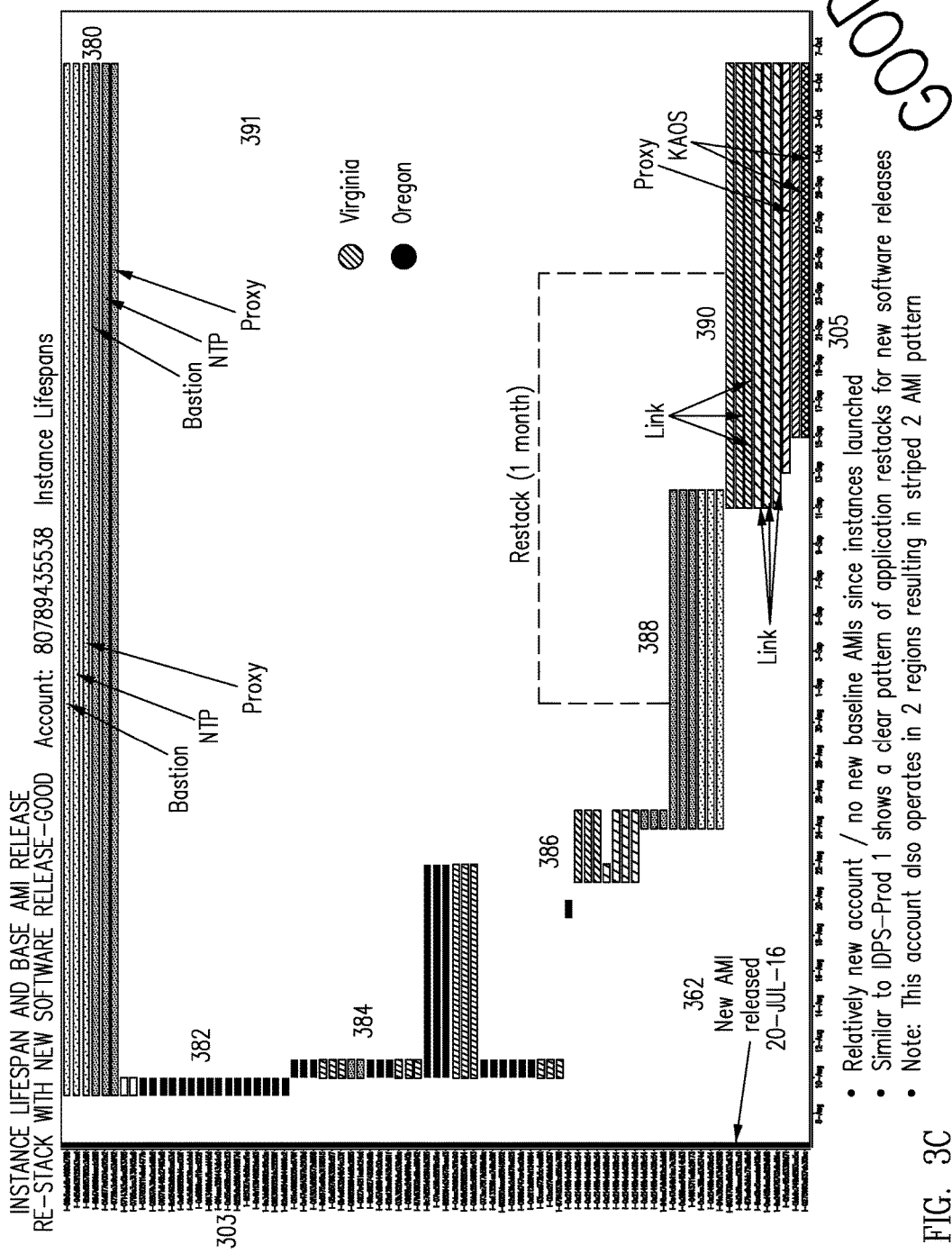
FIG. 3C is a representation of re-stacking data visualization graphic created with actual data in accordance with one embodiment indicating, in the specific example of FIG. 3C, a potentially "good" or "proper" re-stacking policy is being implemented based on software release dates.

While FIGS. 3A and 3B are simplified illustrative examples, FIG. 3C is a representation of re-stacking data visualization graphic 391 created with actual data in accordance with one embodiment. As seen in FIG. 3C, instance group 380 includes instances generated after the AMI release date 362 of July 20 and extend across the entire timeline. Instance groups 382, 384, 386, 388, and 390, represent cascading re-stacks, but not in response to new AMI releases, since the only AMI release date is AMI1 release date visualization graphic 362. Instead, these re-stacking operations were performed based on new software releases.

However, since all of the instances shown in FIGS. 3A, 3B, and 3C are created using the latest base AMI, the re-stacking policies are potentially "good" or "proper."

Figure 4A:
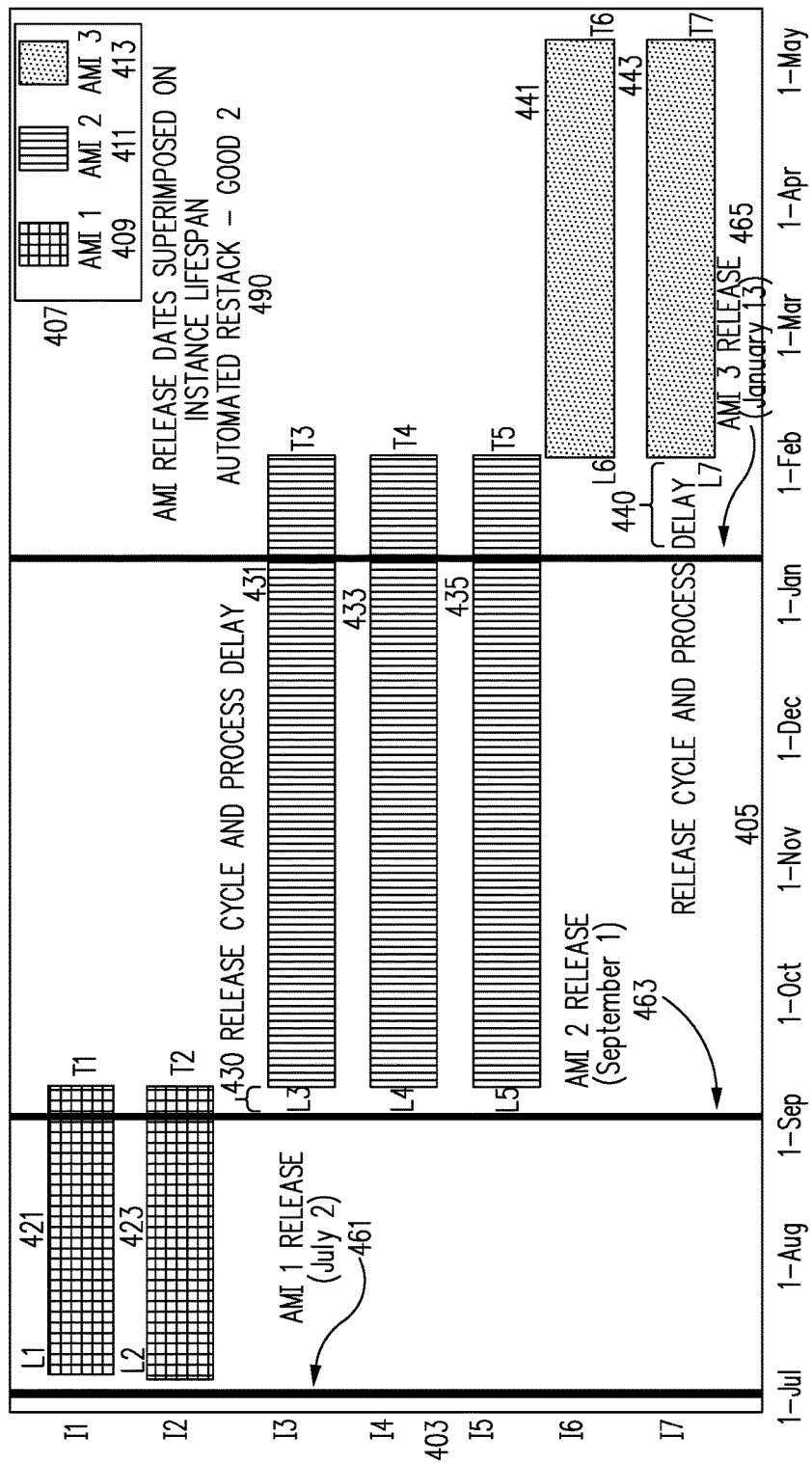
FIG. 4A is a simplified representation of re-stacking data visualization graphic in accordance with one embodiment indicating, in the specific example of FIG. 4A, a potentially "good" or "proper" re-stacking policy is being implemented automatically based on base instance creation template release dates.

FIG. 4A is a simplified illustrative example of another re-stacking data visualization graphic generated at USE THE BASE INSTANCE CREATION TEMPLATE RELEASE DATE DATA TO TRANSFORM THE INSTANCE LIFESPAN VISUALIZATION GRAPHIC INTO A RE-STACKING DATA VISUALIZATION GRAPHIC INDICATING A LAUNCH DATE AND A TERMINATION DATE FOR EACH INSTANCE, AN INDICATION OF THE INSTANCE CREATION TEMPLATE USED TO GENERATE THAT INSTANCE, AND THE BASE INSTANCE CREATION TEMPLATE RELEASE DATES FOR EACH OF THE BASE INSTANCE CREATION TEMPLATES OPERATION 213.

As seen in FIG. 4A, in this specific simplified illustrative example, re-stacking data visualization graphic 490 includes a listing of instance identification data I1, I2, I3, I4, I5, I6 and I7 associated with each of the one or more instances along a first axis, in this particular example the vertical axis 403, and a date timeline associated with the instance lifespans along a second axis, in this particular example the horizontal axis 405.

As also seen in FIG. 4A, in this specific simplified illustrative example, re-stacking data visualization graphic 490 includes: each of the one or more instances I1, I2, I3, I4, I5, I6 and I7 represented by an instance lifespan graphic 421, 423, 431, 433, 435, 441, and 443 correlated to the instance identification data listings I1, I2, I3, I4, I5, I6 and I7, respectively; the launch dates for each instance I1, I2, I3, I4, I5, I6 and I7 of L1, L2, L3, L4, L5, L6, and L7, respectively, correlated to the date timeline of the horizontal axis 405; and the termination dates for each instance I1, I2, I3, I4, I5, I6 and I7 of T1, T2, T3, T4, T5, T6, and T7, respectively, also correlated to the date timeline of the horizontal axis 405.

In addition, as also seen in FIG. 4A, in this specific simplified illustrative example, the particular instance creation template, in this example the AMI, used to generate each of I1, I2, I3, I4, I5, I6 and I7 is indicated by the fill pattern of the individual instance lifespan graphics 421, 423, 431, 433, 435, 441, and 443, respectively. As seen in FIG. 4A, in this specific simplified illustrative example, three fill patterns 409, 411, and 413 in table 407 correspond to AMI1, AMI2, and AMI3, respectively. Consequently, in this specific simplified illustrative example, instances I1 and I2 are shown as having been created on AMI1, instances I3, I4, and I5 are shown as having been created on AMI2, and instances I6 and I7 are shown as having been created on AMI3.

As also seen in FIG. 4A, re-stacking data visualization graphic 490 includes AMI1 release date visualization 461 of July 2; AMI2 release date visualization 463 of September 1; and AMI3 release date visualization 465 of January 13. Consequently, re-stacking data visualization graphic 490 shows that in response to the release of AMI1 on July 2, instances I1 and I2 were generated on launch dates L1 and L2, respectively that were after the AMI1 release date of July 2 and that instances I1 and I2 were terminated on termination dates T1 and T2, respectively, that were slightly after the AMI2 release date of September 1.

As also seen in FIG. 4A, instances I3, I4, and I5, were launched on launch dates L3, L4, and L5, a time 430 after the AMI2 release date of September 1 and instances I3, I4, and I5 are based on the new AMI2.

It is worth noting that the delay in the termination of instances I1 and I2, and the launching of instances I3, I4, and I5, a time 430 after the AMI2 release date of September 1, is explained as a release cycle and processing delay on the part of the application provider/account holder. However, the termination of instances I1 and I2, and the launching of instances I3, I4, and I5 a relatively short time 430 after the AMI2 release date of September 1 indicates that this is a re-stack based on the release of AMI2.

As also seen in FIG. 4A, re-stacking data visualization graphic 490 shows that in response to the release of AMI3 on January 13, instances I3, I4, and I5, were terminated on termination dates T3, T4, and T5, respectively, shortly after the release of AMI3 on January 13, and that instances I6 and I7, were launched on launch dates L6 and L7 a time 440 after the AMI3 release date of January 13 and that instances I6 and I7 are based on the new AMI3.

It is worth noting that, as with the discussion above regarding the post September 1 re-stacking based on the release of AMI2, the delay 440 in the termination of instances I3, I4, and I5, and the launching of instances I6 and I7, is explained as a release cycle and processing delay on the part of the application provider/account holder. However, the termination of instances I3, I4, and I5 and the launching of instances I6 and I7, a relatively short time 440 after the AMI3 release date of January 13 indicates that this is a re-stack based on the release of AMI3.

Consequently, re-stacking data visualization graphic 490 of FIG. 4A is representative of a potentially "good" or "proper" cascaded re-stacking policy based on new base AMI release dates. In fact, re-stacking data visualization graphic 490 of FIG. 4A is representative of an automatically triggered re-stacking policy based on new AMI release dates.

As seen in FIG. 4A, AMI1 release date visualization 461, AMI2 release date visualization 463, and AMI3 release date visualization 465 are visual vertical line representations of the base instance creation template release dates correlated to the date timeline of the horizontal axis 405. However, in various other embodiments, the one or more base instance creation template release dates are included in the re-stacking data visualization graphic as any visual representation of the base instance creation template release dates correlated to the date timeline axis.

Figure 4B:
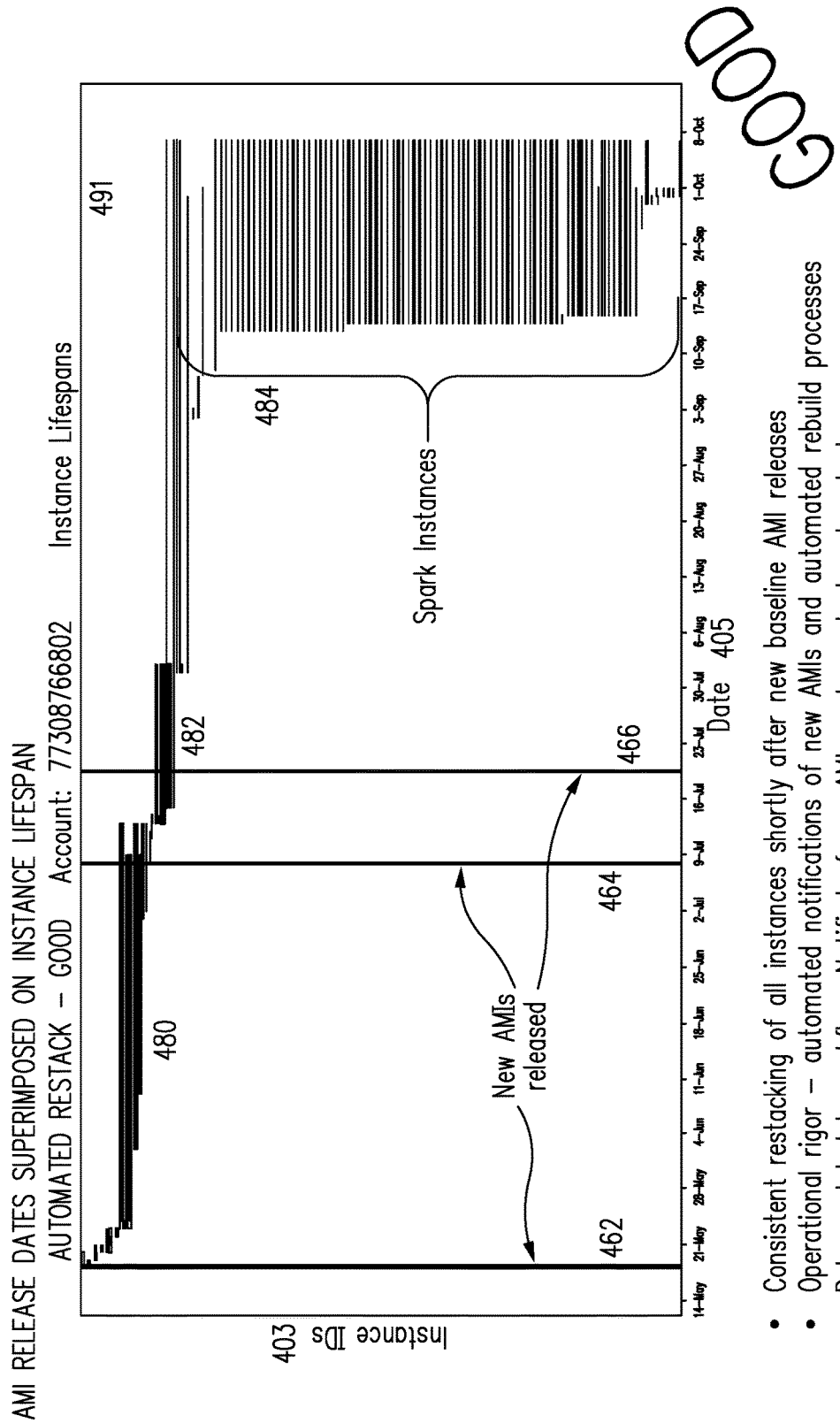
FIG. 4B is a representation of re-stacking data visualization graphic created with actual data in accordance with one embodiment indicating, in the specific example of FIG. 4B, a potentially "good" or "proper" re-stacking policy is being implemented automatically based on base instance creation template (base AMI) release dates.

While FIG. 4A is a simplified illustrative example, FIG. 4B is a representation of a re-stacking data visualization graphic 491 created with actual data in accordance with one embodiment. As seen in FIG. 4B, the individual instances of instance group 480 are instances generated after the AMI1 release date 462. As also seen in FIG. 4B, the individual instances of instance group 480 terminate shortly after the AMI2 release date 464 and the individual instances of instance group 482 are instances generated after the AMI2 release date 464. As also seen in FIG. 4B, the individual instances of instance group 482 terminate shortly after the AMI3 release date 466 and the individual instances of instance group 484 are instances generated after the AMI3 release date 466.

Consequently, like FIG. 4A, FIG. 4B and re-stacking data visualization graphic 491 of FIG. 4B are representative of a potentially "good" or "proper" cascading re-stacking policy based on new base AMI release dates. In fact, re-stacking data visualization graphic 491 of FIG. 4A is representative of an automatically triggered re-stacking policy based on new AMI release dates.

Figure 5:
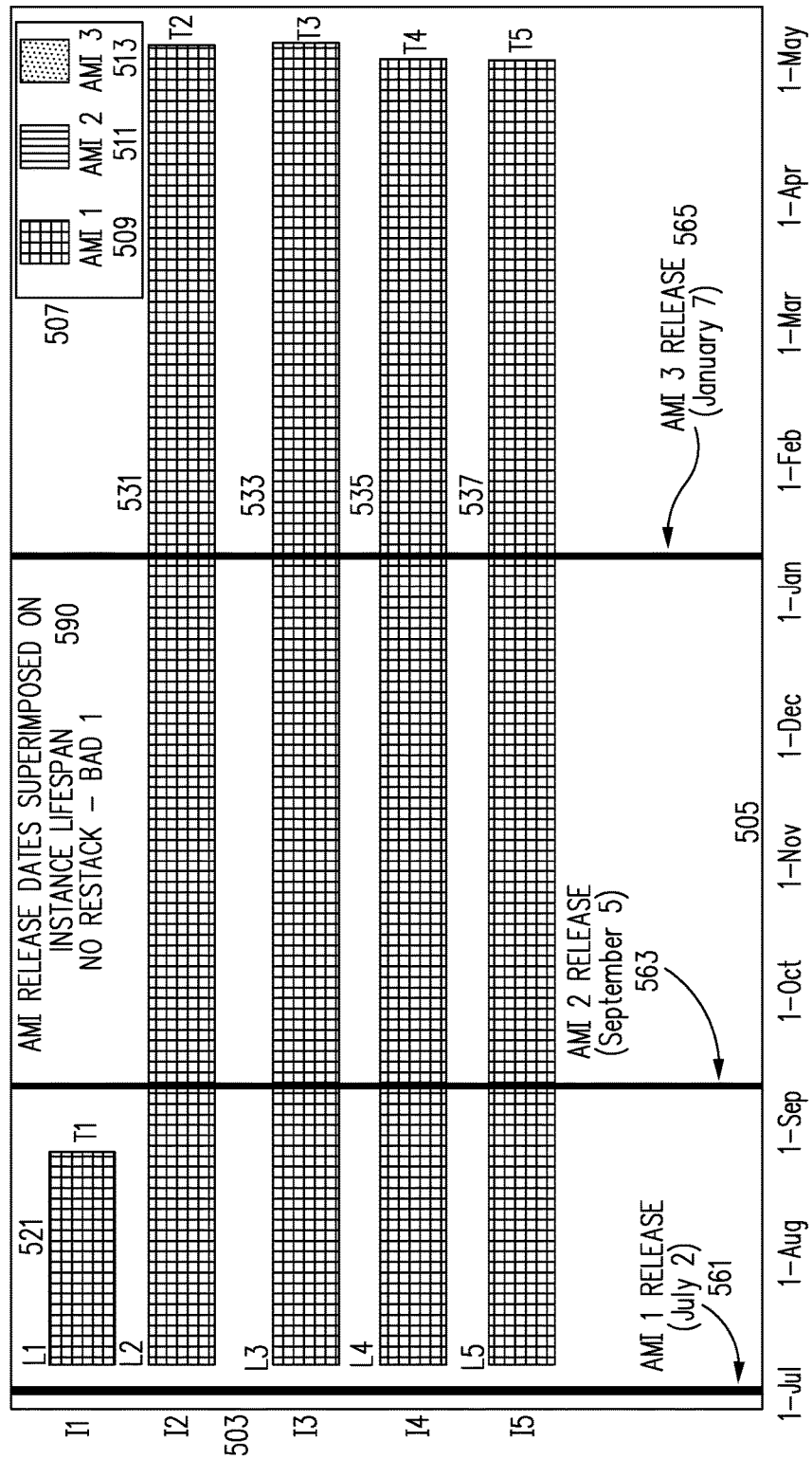
FIG. 5 is a simplified representation of re-stacking data visualization graphic in accordance with one embodiment indicating, in the specific example of FIG. 5, a potentially "bad" or "improper" re-stacking policy is being implemented with little or no re-stacking.

FIG. 5 is a simplified illustrative example of another re-stacking data visualization graphic generated at USE THE BASE INSTANCE CREATION TEMPLATE RELEASE DATE DATA TO TRANSFORM THE INSTANCE LIFESPAN VISUALIZATION GRAPHIC INTO A RE-STACKING DATA VISUALIZATION GRAPHIC INDICATING A LAUNCH DATE AND A TERMINATION DATE FOR EACH INSTANCE, AN INDICATION OF THE INSTANCE CREATION TEMPLATE USED TO GENERATE THAT INSTANCE, AND THE BASE INSTANCE CREATION TEMPLATE RELEASE DATES FOR EACH OF THE BASE INSTANCE CREATION TEMPLATES OPERATION 213.

FIG. 5 is a simplified representation of re-stacking data visualization graphic 590 indicating, in the specific example of FIG. 5, a potentially "bad" or "improper" re-stacking policy being implemented with little or no re-stacking.

As seen in FIG. 5, in this specific simplified illustrative example, re-stacking data visualization graphic 590 includes a listing of instance identification data I1, I2, I3, I4, and I5, associated with each of the one or more instances along a first axis, in this particular example the vertical axis 503, and a date timeline associated with the instance lifespans along a second axis, in this particular example the horizontal axis 505.

As also seen in FIG. 5, in this specific simplified illustrative example, re-stacking data visualization graphic 590 includes: each of the one or more instances I1, I2, I3, I4, and I5 represented by an instance lifespan graphic 521, 531, 533, 535, and 537 correlated to the instance identification data listings I1, I2, I3, I4, and I5, respectively; the launch dates for each instance I1, I2, I3, I4, and I5 of L1, L2, L3, L4, and L5, respectively, correlated to the date timeline of the horizontal axis 505; and the termination dates for each instance I1, I2, I3, I4, and I5 of T1, T2, T3, T4, and T5, respectively, also correlated to the date timeline of the horizontal axis 505.

In addition, as also seen in FIG. 5, in this specific simplified illustrative example, the particular instance creation template, in this example the AMI, used to generate each of I1, I2, I3, I4, and I5 is indicated by the fill pattern of the individual instance lifespan graphics 521, 531, 533, 535, and 537, respectively, although, in this specific illustrative example, only one AMI and associated fill pattern is used. As seen in FIG. 5, in this specific simplified illustrative example, three fill patterns 509, 511, and 513 in table 507 correspond to AMI1, AMI2, and AMI3, respectively, although, in this specific illustrative example, only AMI1 and associated fill pattern 509 is used. Consequently, in this specific simplified illustrative example, all instances I1, I2, I3, I4, and I5 are shown as having been created on AMI1 and continuing on AMI1 across the entire timeline to termination dates T1, T2, T3, T4, and T5, respectively, despite the availability of new base AMI2 on September 5 and new base AMI3 on January 7.

As also seen in FIG. 5, re-stacking data visualization graphic 590 includes AMI1 release date visualization 561 of July 2; AMI2 release date visualization 563 of September 5; and AMI3 release date visualization 565 of January 7. However, re-stacking data visualization graphic 590 shows that no re-stacking was performed in response to the release of AMI2 and AMI3. Consequently, re-stacking data visualization graphic 590 shows that no re-stacking is taking place for this account and therefore the instances associated with the account, and all data processed, is potentially vulnerable to security breaches.

Consequently, re-stacking data visualization graphic 590 of FIG. 5 is representative of a potentially "bad" or "improper" re-stacking policy that ignores new base AMI release dates.

As seen in FIG. 5, AMI1 release date visualization 561, AMI2 release date visualization 563, and AMI3 release date visualization 565 are visual vertical line representations of the base instance creation template release dates correlated to the date timeline of the horizontal axis 505. However, in various other embodiments, the one or more base instance creation template release dates are included in the re-stacking data visualization graphic as any visual representation of the base instance creation template release dates correlated to the date timeline axis.

Figure 6A:
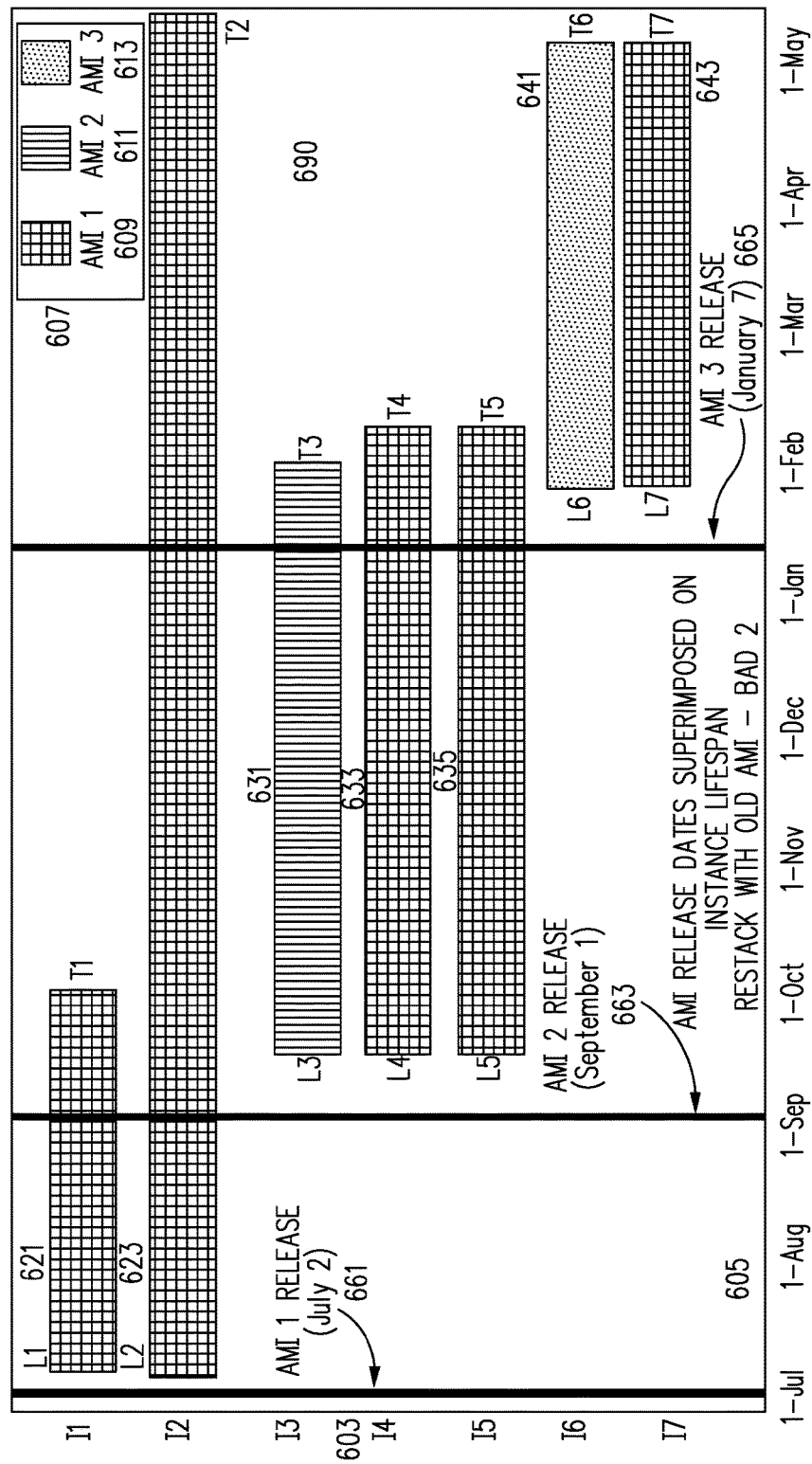
FIG. 6A is a simplified representation of re-stacking data visualization graphic in accordance with one embodiment indicating, in the specific example of FIG. 6A, a potentially "bad" or "improper" re-stacking policy is being implemented with re-stacking of outdated base instance creation templates.

FIG. 6A is a simplified illustrative example of another re-stacking data visualization graphic 690 generated at USE THE BASE INSTANCE CREATION TEMPLATE RELEASE DATE DATA TO TRANSFORM THE INSTANCE LIFESPAN VISUALIZATION GRAPHIC INTO A RE-STACKING DATA VISUALIZATION GRAPHIC INDICATING A LAUNCH DATE AND A TERMINATION DATE FOR EACH INSTANCE, AN INDICATION OF THE INSTANCE CREATION TEMPLATE USED TO GENERATE THAT INSTANCE, AND THE BASE INSTANCE CREATION TEMPLATE RELEASE DATES FOR EACH OF THE BASE INSTANCE CREATION TEMPLATES OPERATION 213.

FIG. 6A is a simplified representation of re-stacking data visualization graphic indicating, in the specific example of FIG. 6A, a potentially "bad" or "improper" re-stacking policy is being implemented with re-stacking using outdated base instance creation templates.

As seen in FIG. 6A, in this specific simplified illustrative example, re-stacking data visualization graphic 690 includes a listing of instance identification data I1, I2, I3, I4, I5, I6 and I7 associated with each of the one or more instances along a first axis, in this particular example the vertical axis 603, and a date timeline associated with the instance lifespans along a second axis, in this particular example the horizontal axis 605.

As also seen in FIG. 6A, in this specific simplified illustrative example, re-stacking data visualization graphic 690 includes: each of the one or more instances I1, I2, I3, I4, I5, I6 and I7 represented by an instance lifespan graphic 621, 623, 631, 633, 635, 641, and 643 correlated to the instance identification data listings I1, I2, I3, I4, I5, I6 and I7, respectively; the launch dates for each instance I1, I2, I3, I4, I5, I6 and I7 of L1, L2, L3, L4, L5, L6, and L7, respectively, correlated to the date timeline of the horizontal axis 605; and the termination dates for each instance I1, I2, I3, I4, I5, I6 and I7 of T1, T2, T3, T4, T5, T6, and T7, respectively, also correlated to the date timeline of the horizontal axis 605.

In addition, as also seen in FIG. 6A, in this specific simplified illustrative example, the particular instance creation template, in this example the AMI, used to generate each of I1, I2, I3, I4, I5, I6 and I7 is indicated by the fill pattern of the individual instance lifespan graphics 621, 623, 631, 633, 635, 641, and 643, respectively. As seen in FIG. 6A, in this specific simplified illustrative example, three fill patterns 609, 611, and 613 in table 607 correspond to AMI1, AMI2, and AMI3, respectively. Consequently, in this specific simplified illustrative example, instances I1, I2, I4, I5, and I7 are shown as having been created on AMI1, instance I3 is shown as having been created on AMI2, and instance I6 is shown as having been created on AMI3.

As also seen in FIG. 6A, re-stacking data visualization graphic 690 includes AMI1 release date visualization 661 of July 2; AMI2 release date visualization 663 of September 1; and AMI3 release date visualization 665 of January 13.

Re-stacking data visualization graphic 690 shows that in response to the release of AMI1 on July 2, instances I1 and I2 were generated on launch dates L1 and L2, respectively, that were after the AMI1 release date of July 2. However, while instance I1 was terminated on termination date T1, shortly after the AMI2 release date of September 1, instance I2 was not terminated until time T2 in May of the following year, well after the AMI2 release date of September 1 and the AMI3 release date of January 13. Consequently, while the instance I1 appears to have been re-stacked based on the release of a new AMI, instance I2 has not been re-stacked and therefore represents a potential vulnerability.

Re-stacking data visualization graphic 690 also shows that in response to the release of AMI2 on September 1, instance I3 was launched on launch date L3, shortly after the release of AMI2 on September 1 and is based on the new AMI2, presumably to replace instance I1. In addition, instances I4 and I5 were launched on launch dates L4 and L5 shortly after the release of AMI2 on September 1. However, instead of being based on the newly released AMI2, instances I4 and I5 are based on the old AMI1. Consequently, even though instances I4 and I5 were launched after the release of AMI2 on September 1, these instances represent potential vulnerabilities since they are not based on the latest AMI.

Re-stacking data visualization graphic 690 also shows that in response to the release of AMI3 on January 13, instance I6 was launched on launch date L6, shortly after the release of AMI3 on January 13, and is based on the new AMI3, presumably to replace instance I3. In addition, instance I7 was launched on launch date L7 shortly after the release of AMI3 on January 13. However, instead of being based on the newly released AMI3, instance I7 is based on the old AMI1. Consequently, even though instance I7 was launched after the release of AMI3, this instance represents a potential vulnerability since it is not based on the latest AMI.

Consequently, by examining re-stacking data visualization graphic 690 it can be seen that instances I1, I3, and I6 appear to be an example of a proper cascaded re-stacking policy with instance I1 on AMI1 being replaced by instance I3 on AMI2 after the release date of AMI2, and instance I3 on AMI2 being replaced by instance I6 on AMI3 after the release date of AMI3. However, instances I2, I4, I5 and I7 are all potentially vulnerable since these instances continue to be based on AMI1 after the release of AMI2 and AMI3. Consequently, re-stacking data visualization graphic 690 of FIG. 6A is representative of a potentially "bad" or "improper" re-stacking policy.

As seen in FIG. 6A, AMI1 release date visualization 661, AMI2 release date visualization 663, and AMI3 release date visualization 665 are visual vertical line representations of the base instance creation template release dates correlated to the date timeline of the horizontal axis 605. However, in various other embodiments, the one or more base instance creation template release dates are included in the re-stacking data visualization graphic as any visual representation of the base instance creation template release dates correlated to the date timeline axis.

Figure 6B:
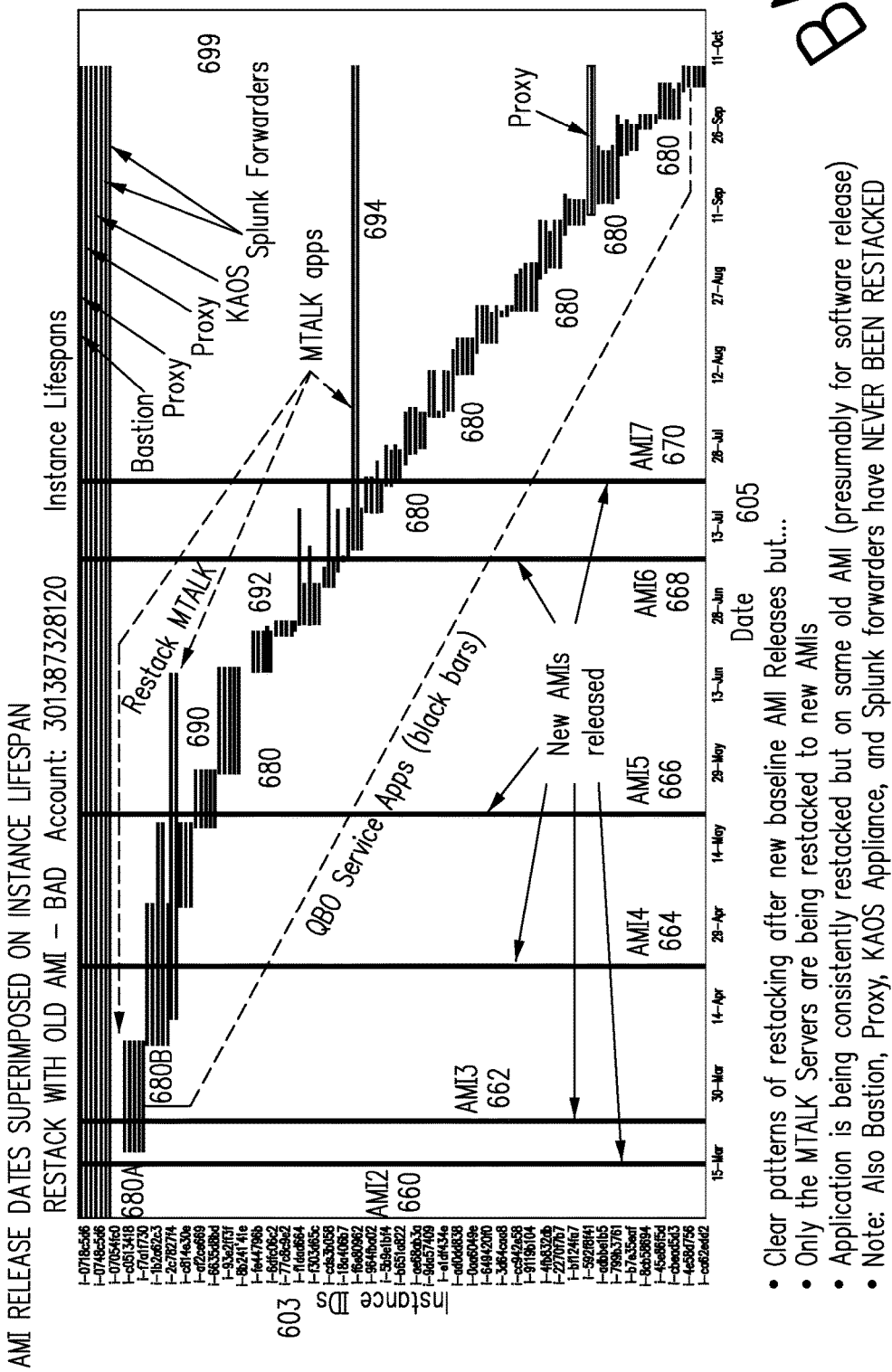
FIG. 6B is a representation of re-stacking data visualization graphic created with actual data in accordance with one embodiment indicating, in the specific example of FIG. 6B, a potentially "bad" or "improper" re-stacking policy is being implemented with re-stacking of outdated base instance creation templates (base AMIs).

While FIG. 6A is a simplified illustrative example, FIG. 6B is a representation of a re-stacking data visualization graphic 699 created with actual data in accordance with one embodiment. As seen in FIG. 6B, the individual instances of instance groups 680A, 680B, and all of 680 (collectively referred to herein as the 680 group of instances), shown in black, are instances generated after the AMI1 release date. As also seen in FIG. 6B, the individual instances of instance group 680 terminate at various times, most in a cascading manner. However, most of the instances of instance groups 680 have termination dates, and most have launch dates, after the release of new AMIs at times 660, 662, 664, 666, 668, and 670. Consequently, almost all of the instances of instance groups 680 represent potential vulnerabilities after AMI2 release date 660.

As seen in FIG. 6B, in this specific example, re-stacking data visualization graphic 699 also shows potentially proper re-stacking with respect to instance groups 680B, 690, 692, and 694. As seen in FIG. 6B, re-stacking data visualization graphic 699 shows that in response to the release of AMI3 at 662, instance group 690 was launched, presumably to replace instance group 680B. Likewise, in response to the release of AMI5 at 666, instance group 692 was launched, presumably to replace instance group 690. Finally, in response to the release of AMI6 at 668, instance group 694 was launched, presumably to replace instance group 692. The apparent cascaded re-stack of instance group 680B into instance group 690, instance group 690 into instance group 692, and instance group 692 into instance group 694 appears to be the only example of a potentially proper restacking policy. However, even this example appears to only re-stack based on some base AMI releases.

The rest of the cascade-like restacking shown in re-stacking data visualization graphic 699 is clearly not based on the release of new AMIs since the same AMI, AMI1, is re-used. Consequently, by examining re-stacking data visualization graphic 699 it can be seen that while there appears to be one example of the proper cascaded re-stacking policy, the instances of the 680 group are all potentially vulnerable since these instances continue to be based on AMI1 after the release of AMI2, AMI3, AMI4, AMI5, AMI6, and AMI7. Consequently, re-stacking data visualization graphic 699 of FIG. 6B is representative of a potentially "bad" or "improper" re-stacking policy.

In one embodiment, once the base instance creation template release date data is used to transform the instance lifespan visualization graphic into a re-stacking data visualization graphic at USE THE BASE INSTANCE CREATION TEMPLATE RELEASE DATE DATA TO TRANSFORM THE INSTANCE LIFESPAN VISUALIZATION GRAPHIC INTO A RE-STACKING DATA VISUALIZATION GRAPHIC INDICATING A LAUNCH DATE AND A TERMINATION DATE FOR EACH INSTANCE, AN INDICATION OF THE INSTANCE CREATION TEMPLATE USED TO GENERATE THAT INSTANCE, AND THE BASE INSTANCE CREATION TEMPLATE RELEASE DATES FOR EACH OF THE BASE INSTANCE CREATION TEMPLATES OPERATION 213, process flow proceeds to PROVIDE THE RE-STACKING DATA VISUALIZATION GRAPHIC TO ONE OR MORE PARTIES OPERATION 215.

In one embodiment, at PROVIDE THE RE-STACKING DATA VISUALIZATION GRAPHIC TO ONE OR MORE PARTIES OPERATION 215, the re-stacking data visualization graphic of USE THE BASE INSTANCE CREATION TEMPLATE RELEASE DATE DATA TO TRANSFORM THE INSTANCE LIFESPAN VISUALIZATION GRAPHIC INTO A RE-STACKING DATA VISUALIZATION GRAPHIC INDICATING A LAUNCH DATE AND A TERMINATION DATE FOR EACH INSTANCE, AN INDICATION OF THE INSTANCE CREATION TEMPLATE USED TO GENERATE THAT INSTANCE, AND THE BASE INSTANCE CREATION TEMPLATE RELEASE DATES FOR EACH OF THE BASE INSTANCE CREATION TEMPLATES OPERATION 213 is evaluated and provided to one or more parties.

In accordance with one embodiment, at PROVIDE THE RE-STACKING DATA VISUALIZATION GRAPHIC TO ONE OR MORE PARTIES OPERATION 215 one or both of the re-stacking data visualization graphic and the re-stacking data visualization graphic data of USE THE BASE INSTANCE CREATION TEMPLATE RELEASE DATE DATA TO TRANSFORM THE INSTANCE LIFESPAN VISUALIZATION GRAPHIC INTO A RE-STACKING DATA VISUALIZATION GRAPHIC INDICATING A LAUNCH DATE AND A TERMINATION DATE FOR EACH INSTANCE, AN INDICATION OF THE INSTANCE CREATION TEMPLATE USED TO GENERATE THAT INSTANCE, AND THE BASE INSTANCE CREATION TEMPLATE RELEASE DATES FOR EACH OF THE BASE INSTANCE CREATION TEMPLATES OPERATION 213 is further analyzed to identify security vulnerabilities and re-stacking policy analysis and results data is generated.

In one embodiment, at PROVIDE THE RE-STACKING DATA VISUALIZATION GRAPHIC TO ONE OR MORE PARTIES OPERATION 215 the account owner/provider of the software application is provided the re-stacking policy analysis and results data and/or is informed of the analysis.

In one embodiment, once the re-stacking data visualization graphic is evaluated and provided to one or more parties at PROVIDE THE RE-STACKING DATA VISUALIZATION GRAPHIC TO ONE OR MORE PARTIES OPERATION 215, process flow proceeds to EXIT OPERATION 230.

In one embodiment, at EXIT OPERATION 230, process 200 for providing visualization of instance data to identify and evaluate re-stacking policies in a cloud computing environment is exited to await new data.

The disclosed embodiments of process 200 for providing visualization of instance data to identify and evaluate re-stacking policies in a cloud computing environment provide an efficient, effective, and highly adaptable solution to the long standing technical need in the cloud computing environment to provide for visualization of re-stacking patterns to identify and evaluate re-stacking policies. However, process 200 for providing visualization of instance data to identify and evaluate re-stacking policies in a cloud computing environment does not encompass, embody, or preclude other forms of innovation in the area of cloud computing security and re-stacking analysis.

In addition, process 200 for providing visualization of instance data to identify and evaluate re-stacking policies in a cloud computing environment is not related to any fundamental economic practice, fundamental data processing practice, mental steps, or pen and paper based solution. In fact, the disclosed embodiments of process 200 for providing visualization of instance data to identify and evaluate re-stacking policies in a cloud computing environment are directed to providing solutions to the relatively new problems associated with cloud computing, re-stacking, cloud vulnerability analysis, and the processing and visualization of large amounts of data, i.e., "big data." Consequently, process 200 for providing visualization of instance data to identify and evaluate re-stacking policies in a cloud computing environment is not directed to, does not encompass, and is not merely, an abstract idea or concept.

In addition, process 200 for providing visualization of instance data to identify and evaluate re-stacking policies in a cloud computing environment provides for significant improvements to the technical fields of cloud computing, data security, vulnerability management, and software application implementation. In addition, by allowing for a simple visual analysis of re-stacking patterns, process 200 for providing visualization of instance data to identify and evaluate re-stacking policies in a cloud computing environment provides for a more rapid response to security issues and application vulnerabilities, as well as fewer requests for data, data transfers, and data analysis.

Consequently, using process 200 for providing visualization of instance data to identify and evaluate re-stacking policies in a cloud computing environment results in more efficient use of human and non-human resources, fewer processor cycles being utilized, reduced memory utilization, and less communications bandwidth being utilized to relay data to, and from, backend systems and client systems.

As a result, computing systems are transformed into faster, more efficient, and more effective computing systems by process 200 for providing visualization of instance data to identify and evaluate re-stacking policies in a cloud computing environment.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the mechanism and/or process used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "using," "integrating," "generating," "monitoring," "determining," "defining," "designating," "obtaining," "accessing," "analyzing," "obtaining," "identifying," "designating," "categorizing," "receiving," "transmitting," "implementing," "associating," "aggregating," "initiating," "collecting," "creating," "transferring," "storing," "searching," "comparing," "providing," "transforming," "incorporating." "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or another device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion, above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method for providing visualization of instance data to identify and evaluate re-stacking policies in a cloud computing environment, the method comprising:
   obtaining access to historical instance operational data associated with one or more instances operating in a cloud computing environment, each of the one or more instances being created using one of one or more instance creation templates, each of the one or more instances being implemented in connection with an application being offered by an application provider through the cloud computing environment;
   for each of the one or more instances, determining an instance creation template of the one of one or more instance creation templates used to create that instance;
   generating instance creation template data for each of the one or more instances, the instance creation template data indicating an instance creation template used to generate each instance of the one or more instances;
   for each of the one or more instances, associating the instance creation template data for the instance with that instance;
   for each of the one or more instances, analyzing the instance operational data associated with the instance to generate instance lifespan data for the instance, the instance lifespan data indicating a launch date of the instance and a termination date for the instance;
   generating instance lifespan visualization data, the instance lifespan visualization data including data for generating an instance lifespan visualization graphic, the instance lifespan visualization graphic including a graphic representation of each of the one or more instances, the graphic representation of each of the one or more instances indicating a launch date of the instance and a termination date for the instance, the graphic representation of each of the one or more instances further including an indication of the instance creation template used to generate that instance;
   obtaining access to base instance creation template release date data, the base instance creation template release date data indicating a release date for each base instance creation template;
   using the base instance creation template release date data to indicate base instance creation template release dates in the instance lifespan visualization graphic, thereby transforming the instance lifespan visualization graphic into a re-stacking data visualization graphic, the re-stacking data visualization graphic including an individual graphic representation of each of the one or more instances indicating a launch date for the instance, a termination date for the instance, an indication of the instance creation template used to generate that instance, and the base instance creation template release dates for each of the base instance creation templates; and providing the re-stacking data visualization graphic to one or more parties.

2. The method for providing visualization of instance data to identify and evaluate re-stacking policies in a cloud computing environment of claim 1 wherein historical instance operational data associated with one or more instances is analyzed to:
- identify instance identification data associated with each of the one or more instances;
- identify image identification data associated with each of the one or more instances;
- identify launch time data associated with each of the one or more instances; and
- identify termination time data associated with each of the one or more instances.

3. The method for providing visualization of instance data to identify and evaluate re-stacking policies in a cloud computing environment of claim 1 wherein the cloud computing environment is an Amazon Web Services (AWS) cloud computing environment and access to historical instance operational data associated with one or more instances is obtained from an AWS Cloud Trail service.

4. The method for providing visualization of instance data to identify and evaluate re-stacking policies in a cloud computing environment of claim 1 wherein the cloud computing environment is an Amazon Web Services (AWS) cloud computing environment and the instance creation templates are Amazon Machine Images (AMIs).

5. The method for providing visualization of instance data to identify and evaluate re-stacking policies in a cloud computing environment of claim 1 wherein the instance lifespan data for each of the one or more instances includes data indicating a launch date of the instance; data indicating a termination date for the instance; data indicating start times associated with the instance; and data indicating stop times associated with the instance.

6. The method for providing visualization of instance data to identify and evaluate re-stacking policies in a cloud computing environment of claim 1 wherein:
- the instance lifespan visualization graphic includes a listing of instance identification data associated with each of the one or more instances along a first axis and a date timeline associated with the instance lifespans along a second axis, further wherein;
- each of the one or more instances in the instance lifespan visualization graphic is represented by an instance lifespan graphic correlated to the instance identification data listing for that instance on the first axis and the launch date of the instance and the termination date for the instance correlated to the date timeline of the second axis.

7. The method for providing visualization of instance data to identify and evaluate re-stacking policies in a cloud computing environment of claim 6 wherein the instance lifespan graphic associated with each of the one or more instances indicates the instance creation template used to generate that instance.

8. The method for providing visualization of instance data to identify and evaluate re-stacking policies in a cloud computing environment of claim 7 wherein the visual appearance of the instance lifespan graphic associated with each of the one or more instances indicates the instance creation template used to generate that instance.

9. The method for providing visualization of instance data to identify and evaluate re-stacking policies in a cloud computing environment of claim 8 wherein the color of the instance lifespan graphic associated with each of the one or more instances indicates the instance creation template used to generate that instance.

10. The method for providing visualization of instance data to identify and evaluate re-stacking policies in a cloud computing environment of claim 8 wherein the shape of the instance lifespan graphic associated with each of the one or more instances indicates the instance creation template used to generate that instance.

11. The method for providing visualization of instance data to identify and evaluate re-stacking policies in a cloud computing environment of claim 1 wherein one or more base instance creation template release dates are included in the re-stacking data visualization graphic as visual representations of the base instance creation template release dates correlated to the date timeline of the second axis.

12. The method for providing visualization of instance data to identify and evaluate re-stacking policies in a cloud computing environment of claim 1 wherein the one or more base instance creation template release dates are included in the re-stacking data visualization graphic as visual vertical line representations of the base instance creation template release dates correlated to the date timeline of the second axis.

13. The method for providing visualization of instance data to identify and evaluate re-stacking policies in a cloud computing environment of claim 1 wherein providing the re-stacking data visualization graphic to one or more parties includes providing the re-stacking data visualization graphic to one or more of the application provider and a provider of the cloud computing environment.

14. The method for providing visualization of instance data to identify and evaluate re-stacking policies in a cloud computing environment of claim 1 further comprising:
- analyzing the re-stacking data visualization graphic to determine the re-stacking policy represented by the re-stacking data visualization graphic;
- determining the effectiveness of the re-stacking policy;
- generating recommendation data indicating proposed changes to the identified re-stacking policy; and
- providing the recommendation data to the one or more of the application provider and a provider of the cloud computing environment.

15. A method for providing visualization of instance data to identify and evaluate re-stacking policies in a cloud computing environment, the method comprising:
- obtaining access to historical instance operational data associated with one or more instances operating in an Amazon Web Service (AWS) cloud computing environment, each of the one or more instances being created using one of one or more Amazon Machine Images (AMIs), each of the one or more instances being implemented in connection with an application being offered by an application provider through AWS;
- for each of the one or more instances, determining an AMI of the one of one or more AMIs used to create that instance;
- generating AMI data for each of the one or more instances, the AMI data indicating what AMI was used to generate each instance of the one or more instances;
- for each of the one or more instances, associating the AMI data for the instance with that instance;
- for each of the one or more instances, analyzing the instance operational data associated with the instance to generate instance lifespan data for that instance, the instance lifespan data indicating a launch date of the instance and a termination date for the instance;

generating instance lifespan visualization data, the instance lifespan visualization data including data for generating an instance lifespan visualization graphic, the instance lifespan visualization graphic including a graphic representation of each of the one or more instances, the graphic representation of each of the one or more instances indicating a launch date of the instance and a termination date for the instance, the graphic representation of each of the one or more instances further including an indication of the AMI used to generate that instance;

obtaining access to base AMI release date data, the base AMI release date data indicating a release date for each base AMI used to create the one or more instances;

using the base AMI release date data to indicate base AMI release dates for each of the AMIs used to create the one or more instances in the instance lifespan visualization graphic, thereby transforming the instance lifespan visualization graphic into a re-stacking data visualization graphic, the re-stacking data visualization graphic including an individual graphic representation of each of the one or more instances indicating a launch date for the instance, a termination date for the instance, an indication of the AMI used to generate that instance, and the base AMI release dates for each of the base AMIs; and providing the re-stacking data visualization graphic to one or more parties.

16. The method for providing visualization of instance data to identify and evaluate re-stacking policies in a cloud computing environment of claim 15 wherein historical instance operational data associated with one or more instances is analyzed to:
identify instance identification data associated with each of the one or more instances;
identify image identification data associated with each of the one or more instances;
identify launch time data associated with each of the one or more instances; and
identify termination time data associated with each of the one or more instances.

17. The method for providing visualization of instance data to identify and evaluate re-stacking policies in a cloud computing environment of claim 15 wherein access to historical instance operational data associated with one or more instances is obtained from an AWS Cloud Trail service.

18. The method for providing visualization of instance data to identify and evaluate re-stacking policies in a cloud computing environment of claim 15 wherein the instance lifespan data for each of the one or more instances includes data indicating a launch date of the instance; data indicating a termination date for the instance; data indicating start times associated with the instance; and data indicating stop times associated with the instance.

19. The method for providing visualization of instance data to identify and evaluate re-stacking policies in a cloud computing environment of claim 15 wherein:
the instance lifespan visualization graphic includes a listing of instance identification data associated with each of the one or more instances along a first axis and a date timeline associated with the instance lifespans along a second axis, further wherein;
each of the one or more instances in the instance lifespan visualization graphic is represented by an instance lifespan graphic correlated to the instance identification data listing for that instance on the first axis and the launch date of the instance and the termination date for the instance correlated to the date timeline of the second axis.

20. The method for providing visualization of instance data to identify and evaluate re-stacking policies in a cloud computing environment of claim 19 wherein the instance lifespan graphic associated with each of the one or more instances indicates the AMI used to generate that instance.

21. The method for providing visualization of instance data to identify and evaluate re-stacking policies in a cloud computing environment of claim 20 wherein the visual appearance of the instance lifespan graphic associated with each of the one or more instances indicates the AMI used to generate that instance.

22. The method for providing visualization of instance data to identify and evaluate re-stacking policies in a cloud computing environment of claim 21 wherein the color of the instance lifespan graphic associated with each of the one or more instances indicates the AMI used to generate that instance.

23. The method for providing visualization of instance data to identify and evaluate re-stacking policies in a cloud computing environment of claim 21 wherein the shape of the instance lifespan graphic associated with each of the one or more instances indicates AMI used to generate that instance.

24. The method for providing visualization of instance data to identify and evaluate re-stacking policies in a cloud computing environment of claim 15 wherein one or more base AMI release dates are included in the re-stacking data visualization graphic as visual representations of the base AMI release dates correlated to the date timeline of the second axis.

25. The method for providing visualization of instance data to identify and evaluate re-stacking policies in a cloud computing environment of claim 15 wherein the one or more base AMI release dates are included in the re-stacking data visualization graphic as visual vertical line representations of the base AMI release dates correlated to the date timeline of the second axis.

26. The method for providing visualization of instance data to identify and evaluate re-stacking policies in a cloud computing environment of claim 15 wherein providing the re-stacking data visualization graphic to one or more parties includes providing the re-stacking data visualization graphic to one or more of the application provider and a provider of the cloud computing environment.

27. The method for providing visualization of instance data to identify and evaluate re-stacking policies in a cloud computing environment of claim 15 further comprising:
analyzing the re-stacking data visualization graphic to determine the re-stacking policy represented by the re-stacking data visualization graphic;
determining the effectiveness of the re-stacking policy;
generating recommendation data indicating proposed changes to the identified re-stacking policy; and
providing the recommendation data to the one or more of the application provider and a provider of the cloud computing environment.

28. A system for providing visualization of instance data to identify and evaluate re-stacking policies in a cloud computing environment, comprising:
a cloud computing environment;
one or more instances operating in the cloud computing environment, each of the one or more instances being created using one of one or more instance creation templates, each of the one or more instances being implemented in connection with an application being offered by an application provider through the cloud computing environment;

a historical instance operational data access module for obtaining access to historical instance operational data associated with the one or more instances operating in the cloud computing environment;

an instance creation template data generation module for determining an instance creation template of the one of one or more instance creation templates used to create each instance of the one or more instances and generating instance creation template data for each of the one or more instances indicating which instance creation template was used to generate each instance and associating the base instance creation template data for the instance with that instance;

an instance lifespan data generation module for analyzing the instance operational data associated with each instance of the one or more instances to generate instance lifespan data for that instance, the instance lifespan data indicating a launch date of the instance and a termination date for the instance;

an instance lifespan visualization generation module for generating instance lifespan visualization data, the instance lifespan visualization data including data for generating an instance lifespan visualization graphic, the instance lifespan visualization graphic including a graphic representation of each of the one or more instances, the graphic representation of each of the one or more instances indicating a launch date of the instance and a termination date for the instance, the graphic representation of each of the one or more instances further including an indication of the instance creation template used to generate that instance;

a base instance creation template release date data generation module for obtaining access to base instance creation template release date data, the base instance creation template release date data indicating a release date for each base instance creation template;

a re-stacking data visualization graphic generation module for generating a re-stacking data visualization graphic by using the base instance creation template release date data to indicate base instance creation template release dates in the instance lifespan visualization graphic, thereby transforming the instance lifespan visualization graphic into a re-stacking data visualization graphic, the re-stacking data visualization graphic including an individual graphic representation of each of the one or more instances indicating a launch date for the instance, a termination date for the instance, an indication of the instance creation template used to generate that instance, and the base instance creation template release dates for each of the base instance creation templates; and a re-stacking data visualization graphic display module for providing the re-stacking data visualization graphic to one or more parties on one or more computing systems.

29. The system for providing visualization of instance data to identify and evaluate re-stacking policies in a cloud computing environment of claim 28 wherein historical instance operational data associated with one or more instances is analyzed to:

identify instance identification data associated with each of the one or more instances;

identify image identification data associated with each of the one or more instances;

identify launch time data associated with each of the one or more instances; and identify termination time data associated with each of the one or more instances.

30. The system for providing visualization of instance data to identify and evaluate re-stacking policies in a cloud computing environment of claim 28 wherein the cloud computing environment is an Amazon Web Services (AWS) cloud computing environment and access to historical instance operational data associated with one or more instances is obtained from an AWS Cloud Trail service.

31. The system for providing visualization of instance data to identify and evaluate re-stacking policies in a cloud computing environment of claim 28 wherein the cloud computing environment is an Amazon Web Services (AWS) cloud computing environment and the instance creation templates are Amazon Machine Images (AMIs).

32. The system for providing visualization of instance data to identify and evaluate re-stacking policies in a cloud computing environment of claim 28 wherein the instance lifespan data for each of the one or more instances includes data indicating a launch date of the instance; data indicating a termination date for the instance; data indicating start times associated with the instance; and data indicating stop times associated with the instance.

33. The system for providing visualization of instance data to identify and evaluate re-stacking policies in a cloud computing environment of claim 28 wherein:

the instance lifespan visualization graphic includes a listing of instance identification data associated with each of the one or more instances along a first axis and a date timeline associated with the instance lifespans along a second axis, further wherein;

each of the one or more instances in the instance lifespan visualization graphic is represented by an instance lifespan graphic correlated to the instance identification data listing for that instance on the first axis and the launch date of the instance and the termination date for the instance correlated to the date timeline of the second axis.

34. The system for providing visualization of instance data to identify and evaluate re-stacking policies in a cloud computing environment of claim 33 wherein the instance lifespan graphic associated with each of the one or more instances indicates the instance creation template used to generate that instance.

35. The system for providing visualization of instance data to identify and evaluate re-stacking policies in a cloud computing environment of claim 34 wherein the visual appearance of the instance lifespan graphic associated with each of the one or more instances indicates the instance creation template used to generate that instance.

36. The system for providing visualization of instance data to identify and evaluate re-stacking policies in a cloud computing environment of claim 34 wherein the color of the instance lifespan graphic associated with each of the one or more instances indicates the instance creation template used to generate that instance.

37. The system for providing visualization of instance data to identify and evaluate re-stacking policies in a cloud computing environment of claim 34 wherein the shape of the instance lifespan graphic associated with each of the one or more instances indicates the instance creation template used to generate that instance.

38. The system for providing visualization of instance data to identify and evaluate re-stacking policies in a cloud computing environment of claim 28 wherein one or more base instance creation template release dates are included in the re-stacking data visualization graphic as visual representations of the base instance creation template release dates correlated to the date timeline of the second axis.

39. The system for providing visualization of instance data to identify and evaluate re-stacking policies in a cloud computing environment of claim 28 wherein the one or more base instance creation template release dates are included in the re-stacking data visualization graphic as visual vertical line representations of the base instance creation template release dates correlated to the date timeline of the second axis.

40. The system for providing visualization of instance data to identify and evaluate re-stacking policies in a cloud computing environment of claim 28 wherein providing the re-stacking data visualization graphic to one or more parties includes providing the re-stacking data visualization graphic to one or more of the application provider and a provider of the cloud computing environment.

41. A computer program product for providing visualization of instance data to identify and evaluate re-stacking policies in a cloud computing environment, the computer program product including machine readable instructions for implementing a process method and system for providing visualization of instance data to identify and evaluate re-stacking policies in a cloud computing environment, the process method and system for providing visualization of instance data to identify and evaluate re-stacking policies in a cloud computing environment comprising:
　　obtaining access to historical instance operational data associated with one or more instances operating in a cloud computing environment, each of the one or more instances being created using one of one or more instance creation templates, each of the one or more instances being implemented in connection with an application being offered by an application provider through the cloud computing environment;
　　for each of the one or more instances, determining an instance creation template of the one of one or more instance creation templates used to create that instance;
　　generating instance creation template data for each of the one or more instances, the instance creation template data indicating an instance creation template used to generate each instance of the one or more instances;
　　for each of the one or more instances, associating the instance creation template data for the instance with that instance;
　　for each of the one or more instances, analyzing the instance operational data associated with the instance to generate instance lifespan data for the instance, the instance lifespan data indicating a launch date of the instance and a termination date for the instance;
　　generating instance lifespan visualization data, the instance lifespan visualization data including data for generating an instance lifespan visualization graphic, the instance lifespan visualization graphic including a graphic representation of each of the one or more instances, the graphic representation of each of the one or more instances indicating a launch date of the instance and a termination date for the instance, the graphic representation of each of the one or more instances further including an indication of the instance creation template used to generate that instance;
　　obtaining access to base instance creation template release date data, the base instance creation template release date data indicating a release date for each base instance creation template;
　　using the base instance creation template release date data to indicate base instance creation template release dates in the instance lifespan visualization graphic, thereby transforming the instance lifespan visualization graphic into a re-stacking data visualization graphic, the re-stacking data visualization graphic including an individual graphic representation of each of the one or more instances indicating a launch date for the instance, a termination date for the instance, an indication of the instance creation template used to generate that instance, and the base instance creation template release dates for each of the base instance creation templates; and
　　providing the re-stacking data visualization graphic to one or more parties.

42. The computer program product for providing visualization of instance data to identify and evaluate re-stacking policies in a cloud computing environment of claim 41 wherein historical instance operational data associated with one or more instances is analyzed to:
　　identify instance identification data associated with each of the one or more instances;
　　identify image identification data associated with each of the one or more instances;
　　identify launch time data associated with each of the one or more instances; and
　　identify termination time data associated with each of the one or more instances.

43. The computer program product for providing visualization of instance data to identify and evaluate re-stacking policies in a cloud computing environment of claim 41 wherein the cloud computing environment is an Amazon Web Services (AWS) cloud computing environment and access to historical instance operational data associated with one or more instances is obtained from an AWS Cloud Trail service.

44. The computer program product for providing visualization of instance data to identify and evaluate re-stacking policies in a cloud computing environment of claim 41 wherein the cloud computing environment is an Amazon Web Services (AWS) cloud computing environment and the instance creation templates are Amazon Machine Images (AMIs).

45. The computer program product for providing visualization of instance data to identify and evaluate re-stacking policies in a cloud computing environment of claim 41 wherein the instance lifespan data for each of the one or more instances includes data indicating a launch date of the instance; data indicating a termination date for the instance; data indicating start times associated with the instance; and data indicating stop times associated with the instance.

46. The computer program product for providing visualization of instance data to identify and evaluate re-stacking policies in a cloud computing environment of claim 41 wherein:
　　the instance lifespan visualization graphic includes a listing of instance identification data associated with each of the one or more instances along a first axis and a date timeline associated with the instance lifespans along a second axis, further wherein;
　　each of the one or more instances in the instance lifespan visualization graphic is represented by an instance lifespan graphic correlated to the instance identification data listing for that instance on the first axis and the launch date of the instance and the termination date for the instance correlated to the date timeline of the second axis.

47. The computer program product for providing visualization of instance data to identify and evaluate re-stacking policies in a cloud computing environment of claim 46 wherein the instance lifespan graphic associated with each of the one or more instances indicates the instance creation template used to generate that instance.

48. The computer program product for providing visualization of instance data to identify and evaluate re-stacking policies in a cloud computing environment of claim 47 wherein the visual appearance of the instance lifespan graphic associated with each of the one or more instances indicates the instance creation template used to generate that instance.

49. The computer program product for providing visualization of instance data to identify and evaluate re-stacking policies in a cloud computing environment of claim 48 wherein the color of the instance lifespan graphic associated with each of the one or more instances indicates the instance creation template used to generate that instance.

50. The computer program product for providing visualization of instance data to identify and evaluate re-stacking policies in a cloud computing environment of claim 48 wherein the shape of the instance lifespan graphic associated with each of the one or more instances indicates the instance creation template used to generate that instance.

51. The computer program product for providing visualization of instance data to identify and evaluate re-stacking policies in a cloud computing environment of claim 41 wherein one or more base instance creation template release dates are included in the re-stacking data visualization graphic as visual representations of the base instance creation template release dates correlated to the date timeline of the second axis.

52. The computer program product for providing visualization of instance data to identify and evaluate re-stacking policies in a cloud computing environment of claim 41 wherein the one or more base instance creation template release dates are included in the re-stacking data visualization graphic as visual vertical line representations of the base instance creation template release dates correlated to the date timeline of the second axis.

53. The computer program product for providing visualization of instance data to identify and evaluate re-stacking policies in a cloud computing environment of claim 41 wherein providing the re-stacking data visualization graphic to one or more parties includes providing the re-stacking data visualization graphic to one or more of the application provider and a provider of the cloud computing environment.

54. The computer program product for providing visualization of instance data to identify and evaluate re-stacking policies in a cloud computing environment of claim 41 further comprising:
- analyzing the re-stacking data visualization graphic to determine the re-stacking policy represented by the re-stacking data visualization graphic;
- determining the effectiveness of the re-stacking policy;
- generating recommendation data indicating proposed changes to the identified re-stacking policy; and
- providing the recommendation data to the one or more of the application provider and a provider of the cloud computing environment.

* * * * *